United States Patent
Zewail et al.

(10) Patent No.: US 12,389,410 B2
(45) Date of Patent: Aug. 12, 2025

(54) MULTI-PDSCH OR MULTI-PUSCH GRANT FOR NON-CONTIGUOUS RESOURCES ON MULTIPLE SLOTS

(71) Applicant: QUALCOMM Incorporated, San Diego, CA (US)

(72) Inventors: Ahmed Abdelaziz Ibrahim Abdelaziz Zewail, San Diego, CA (US); Qingjiang Tian, San Diego, CA (US); Jing Sun, San Diego, CA (US); Xiaoxia Zhang, San Diego, CA (US); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 332 days.

(21) Appl. No.: 17/652,263

(22) Filed: Feb. 23, 2022

(65) Prior Publication Data

US 2022/0361220 A1    Nov. 10, 2022

Related U.S. Application Data

(60) Provisional application No. 63/197,278, filed on Jun. 4, 2021, provisional application No. 63/186,701, filed on May 10, 2021.

(51) Int. Cl.
*H04W 72/23* (2023.01)
*H04W 72/0446* (2023.01)
*H04W 72/1268* (2023.01)

(52) U.S. Cl.
CPC ....... *H04W 72/23* (2023.01); *H04W 72/0446* (2013.01); *H04W 72/1268* (2013.01)

(58) Field of Classification Search
CPC ............ H04W 72/23; H04W 72/0446; H04W 72/1268; H04W 72/20
See application file for complete search history.

(56) References Cited

U.S. PATENT DOCUMENTS

| | | | |
|---|---|---|---|
| 2020/0162208 A1* | 5/2020 | Moon | H04L 1/189 |
| 2021/0219329 A1* | 7/2021 | Zhou | H04L 1/1896 |
| 2022/0045805 A1* | 2/2022 | Karaki | H04L 1/1864 |
| 2022/0191903 A1* | 6/2022 | Bae | H04L 1/1893 |
| 2022/0272724 A1* | 8/2022 | Oteri | H04W 72/23 |
| 2022/0295484 A1* | 9/2022 | Yi | H04W 72/0446 |

(Continued)

OTHER PUBLICATIONS

Apple, "Discussion on multi-PxSCH and HARQ Codebook Enhancement", Apr. 12-20, 2021, 3GPP, 3GPP TSG RAN WG1 #104b-e R1-2105094 (Year: 2021).*

*Primary Examiner* — Michael K Phillips
(74) *Attorney, Agent, or Firm* — Procopio, Cory, Hargreaves & Savitch LLP

(57) ABSTRACT

A UE receives, from a base station, a single downlink control information (DCI) indicating a multiple PDSCH grant for at least a first PDSCH in a first slot and a second PDSCH in a second slot. The UE receives the first PDSCH in a first set of symbols in the first slot and receives the second PDSCH in a second set of symbols in the second slot. A UE receives, from a base station, a single DCI indicating a multiple PUSCH grant for at least a first PUSCH in a first slot and a second PUSCH in a second slot. The UE transmits the first PUSCH in a first set of symbols in the first slot and transmits the second PUSCH in a second set of symbols in the second slot.

29 Claims, 21 Drawing Sheets

(56) References Cited

U.S. PATENT DOCUMENTS

| | | | |
|---|---|---|---|
| 2022/0346104 A1* | 10/2022 | Yi | H04W 72/56 |
| 2023/0023656 A1* | 1/2023 | Rastegardoost | H04W 72/0446 |
| 2023/0140213 A1* | 5/2023 | Awadin | H04L 5/0044 |
| | | | 370/329 |
| 2023/0262699 A1* | 8/2023 | Kusashima | H04L 5/0053 |
| 2024/0040587 A1* | 2/2024 | Rastegardoost | H04W 72/232 |

\* cited by examiner

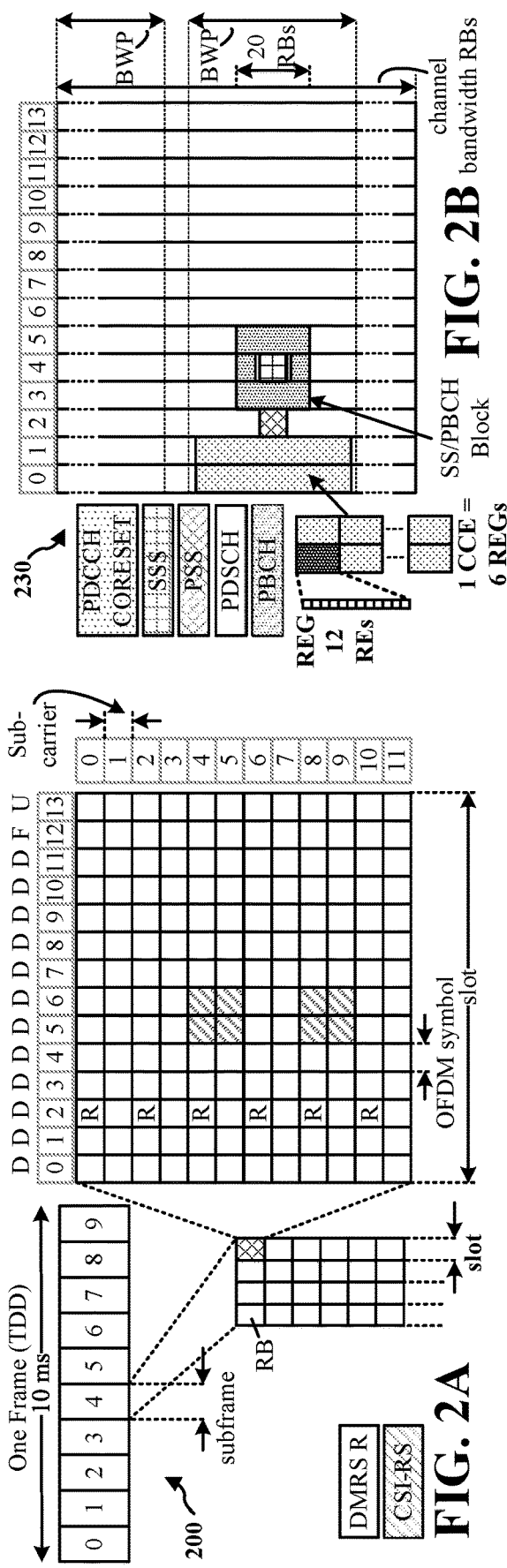
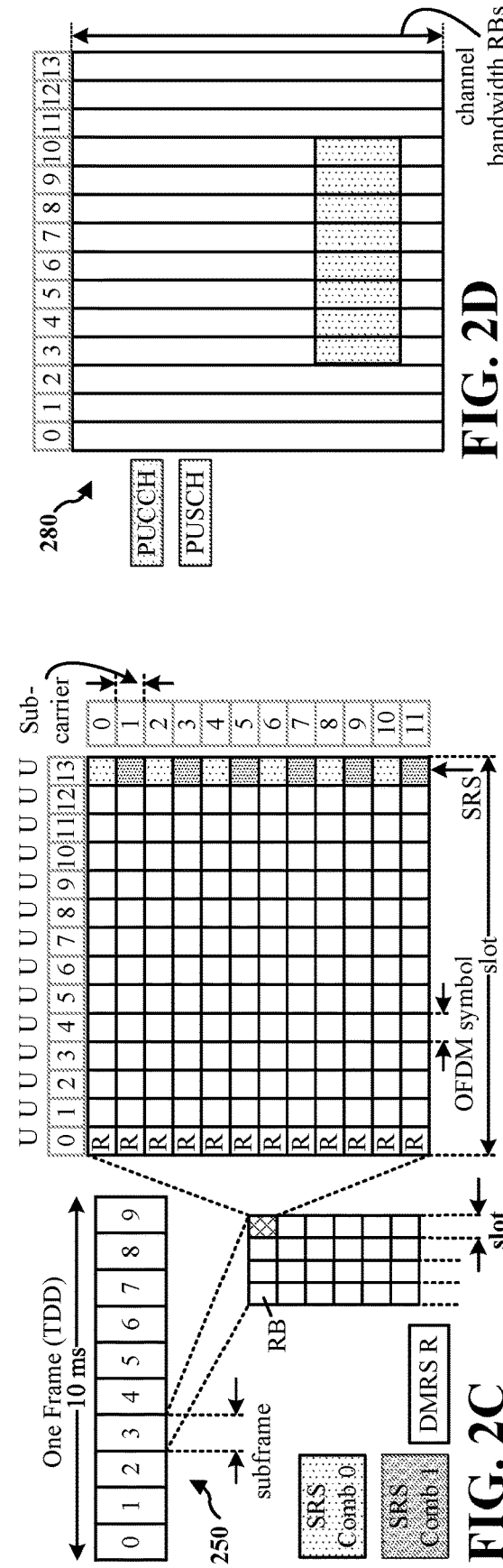
FIG. 2A
FIG. 2B
FIG. 2C
FIG. 2D

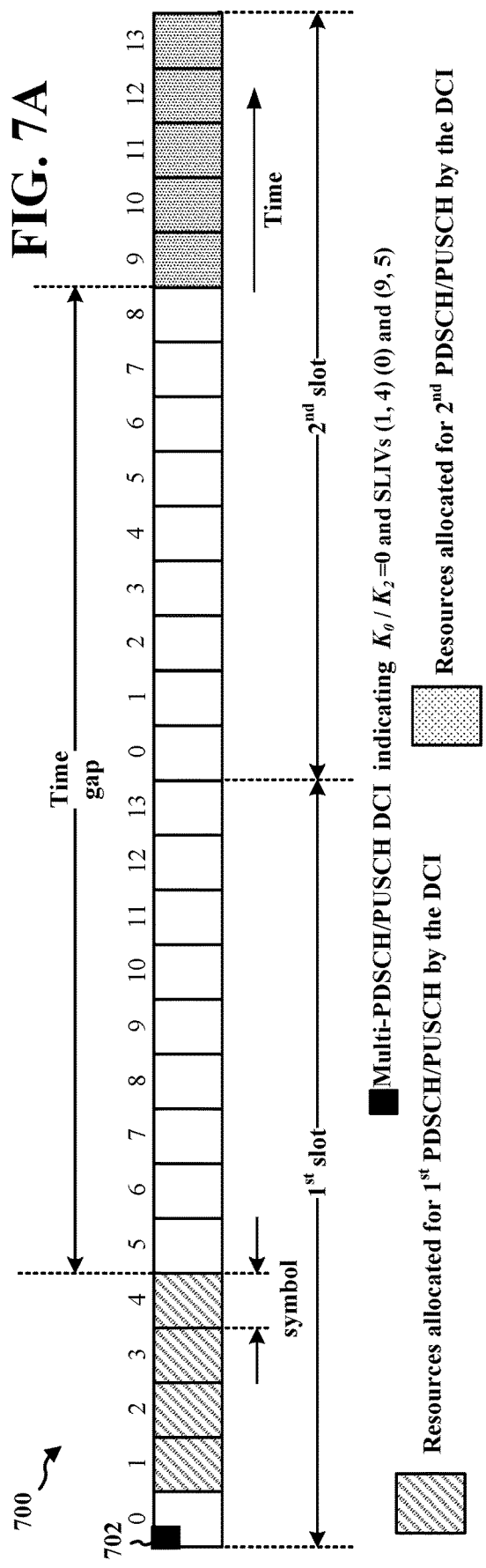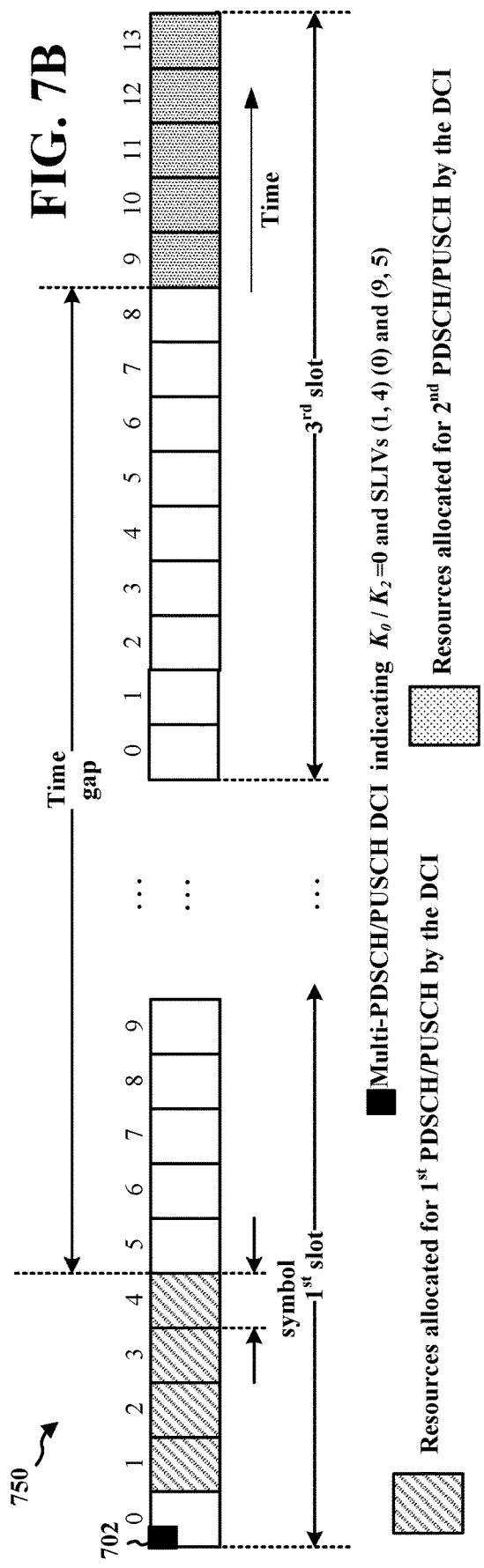
FIG. 7A
FIG. 7B

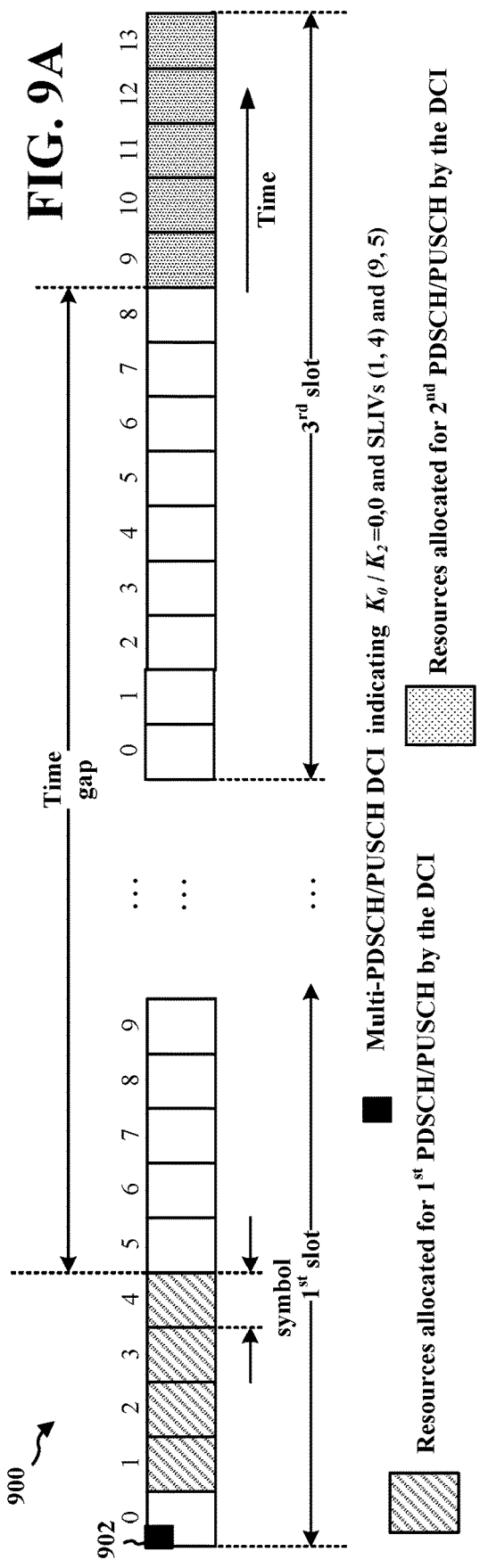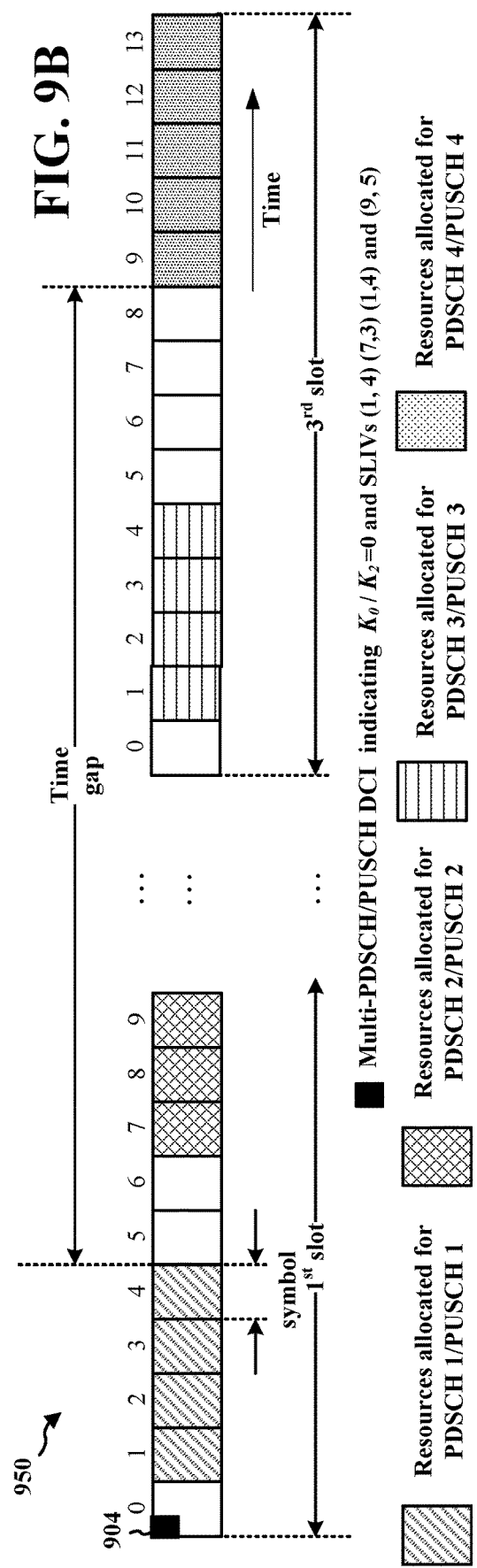

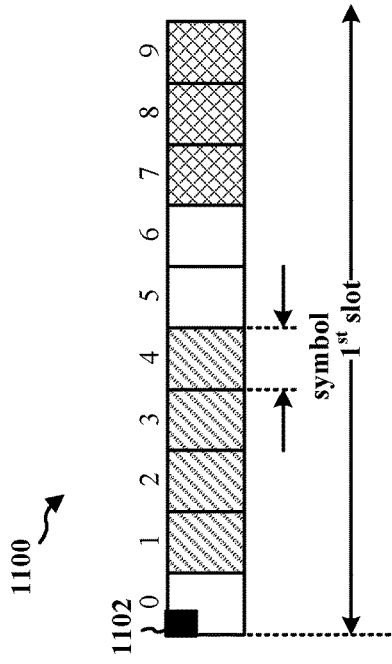
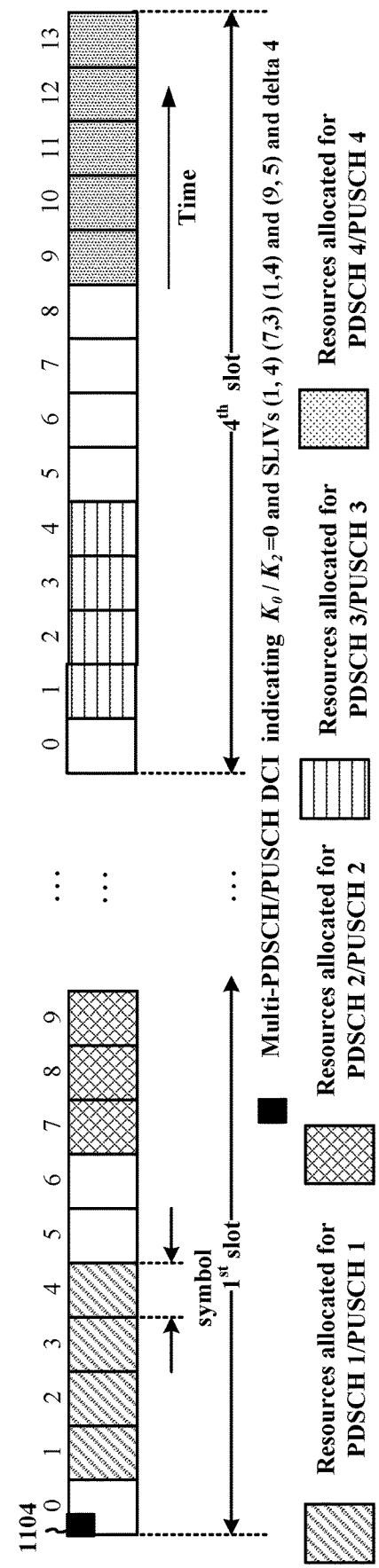
FIG. 11A
FIG. 11B

MULTI-PDSCH OR MULTI-PUSCH GRANT FOR NON-CONTIGUOUS RESOURCES ON MULTIPLE SLOTS

CROSS REFERENCE TO RELATED APPLICATION(S)

This application claims the benefit of and priority to U.S. Provisional Application Ser. No. 63/186,701, entitled "Multi-PDSCH or Multi-PUSCH Grant for Non-Contiguous Resources on Multiple Slots" and filed on May 10, 2021, and U.S. Provisional Application Ser. No. 63/197,278, entitled "Multi-PDSCH or Multi-PUSCH Grant for Non-Contiguous Resources on Multiple Slots" and filed on Jun. 4, 2021, which is expressly incorporated by reference herein in its entirety.

TECHNICAL FIELD

The present disclosure relates generally to communication systems, and more particularly, to wireless communication including a grant for multiple physical downlink shared channel (PDSCH) reception or multiple physical uplink shared channel (PUSCH) transmissions.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus receives, from a base station, a single downlink control information (DCI) indicating a multiple PDSCH grant for at least a first PDSCH in a first slot and a second PDSCH in a second slot. The apparatus receives the first PDSCH in a first set of symbols in the first slot and receives the second PDSCH in a second set of symbols in the second slot.

In another aspect of the disclosure, a method, a computer-readable medium, and an apparatus are provided for wireless communication at a UE. The apparatus receives, from a base station, a single DCI indicating a multiple PUSCH grant for at least a first PUSCH in a first slot and a second PUSCH in a second slot. The apparatus transmits the first PUSCH in a first set of symbols in the first slot and transmits the second PUSCH in a second set of symbols in the second slot.

In another aspect of the disclosure, a method, a computer-readable medium, and an apparatus are provided for wireless communication at a base station. The apparatus transmits, to a UE, a single DCI indicating a multiple PUSCH grant for at least a first PUSCH in a first slot and a second PUSCH in a second slot. The apparatus receives the first PUSCH in a first set of symbols in the first slot and receives the second PUSCH in a second set of symbols in the second slot.

In another aspect of the disclosure, a method, a computer-readable medium, and an apparatus are provided for wireless communication at a base station. The apparatus transmits, to a UE, a single DCI indicating a multiple PUSCH grant for at least a first PUSCH in a first slot and a second PUSCH in a second slot. The apparatus receives the first PUSCH in a first set of symbols in the first slot and receives the second PUSCH in a second set of symbols in the second slot.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIGS. 7A and 7B illustrate an example time diagram showing non-contiguous PDSCH/PUSCH allocations based on a single DCI.

FIGS. 9A and 9B illustrate example time diagrams showing non-contiguous PDSCH/PUSCH allocations based on a single DCI.

FIGS. 11A and 11B illustrate example time diagrams showing non-contiguous PDSCH/PUSCH allocations based on a single DCI.

DETAILED DESCRIPTION

Figure 1:
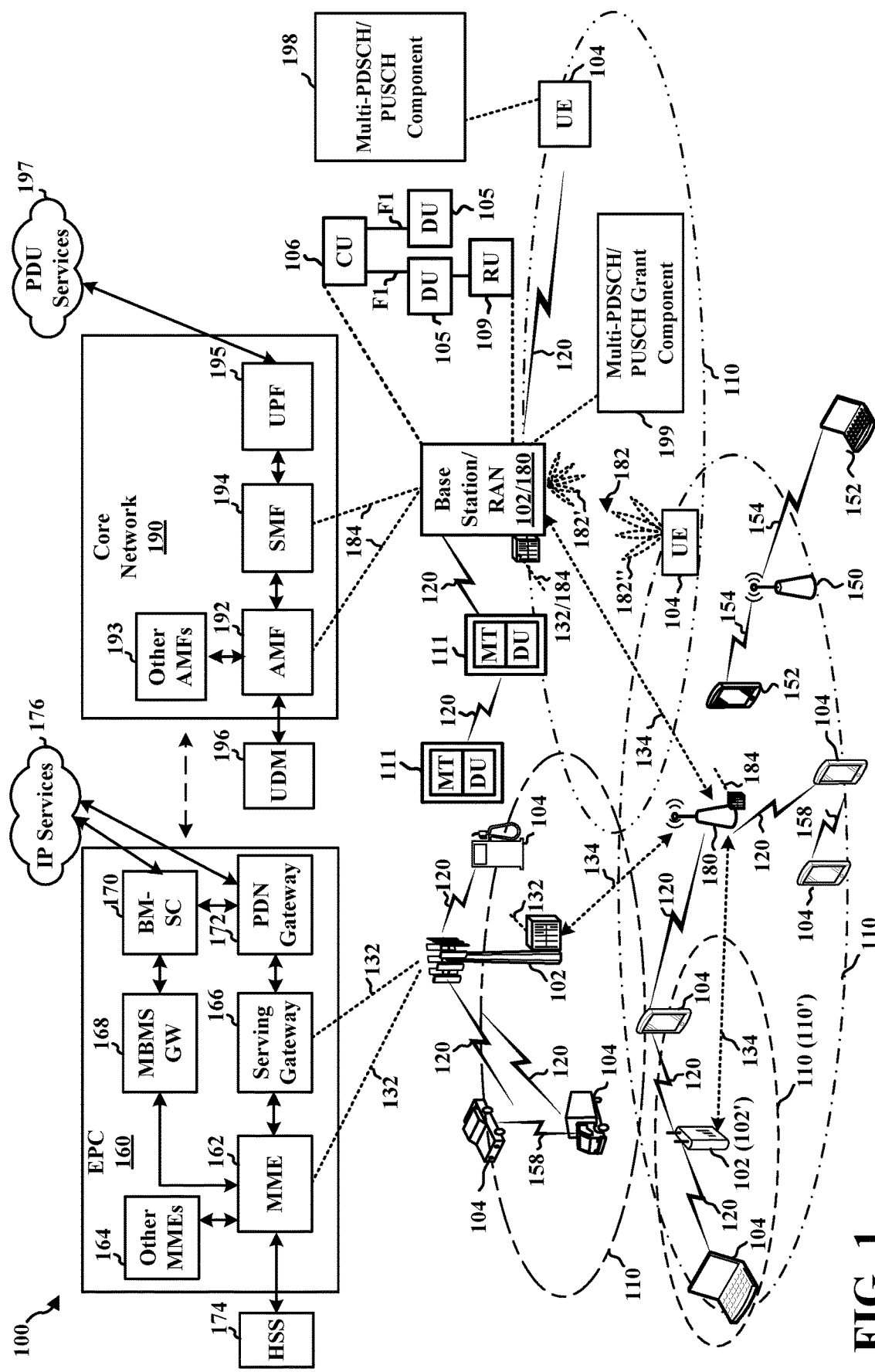
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

A base station may provide a UE with a single DCI to schedule multiple PDSCH transmissions to the UE (e.g., multiple downlink (DL) TBs) or multiple PUSCH transmissions from the UE (e.g., multiple uplink (UL) TBs). In some aspects, the resource allocation may be across multiple slots. The single DCI may reduce the control signaling overhead and/or may reduce monitoring and processing of scheduling physical downlink control channel (PDCCH) at the UE. As an example, a UE may avoid monitoring for and/or processing scheduling PDCCH in each slot if the base station provides the UE with a single DCI that allocates resources in multiple slots. While multiple PDSCH/PUSCH scheduling DCI may reduce overhead, the DCI may schedule long periods of traffic in a single direction. Some wireless communication may be associated with low-latency requirements for both uplink and downlink traffic, which may not be provided if resources are allocated for one direction of traffic over contiguous resources in multiple slots. Multiple PDSCH/PUSCH scheduling over non-contiguous sets of resources allows for downlink and uplink traffic between the UE and the base station to be interlaced in time, e.g., enabling the UE to switch between uplink and downlink traffic, while still providing the reduced DCI control overhead and control monitoring through use of a single DCI. Aspects presented herein provide for larger gaps in time between multiple PDSCH/PUSCH resource allocations provided in a single DCI, which may enable improved use of time gaps between the resource allocations to monitor/transmit/receive communication in an opposite traffic direction between the allocated resources.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and/or another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In another deployment example, the base station may also be configured to support 4G LTE or other access technology at the same time. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184 (e.g., an Xn interface), and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). In another example, the base stations may also support Non-Public Network (NPN), in the form of either stand-alone Non-Public Network (SNPN) or Public Network Integrated NPN (PNI-NPN). Access to the base stations may be controlled with Closed Access Group (CAG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user plane PDU session packets, e.g. IP, Ethernet, or unstructured packets, are transferred through the UPF 195. The UPF 195 may provide UE IP address allocation as well as other functions. The UPF 195 is connected to the PDU Services 197. The PDU Services 197 may include the Internet, an intranet, an IP Multimedia Subsystem (IMS), a Packet Switch (PS) Streaming (PSS) Service, and/or other IP or non-IP based services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a multi-PDSCH/PUSCH component 198 configured to receive, from a base station 102 or 180, a single DCI indicating a multiple PDSCH/PUSCH grant for at least a first PDSCH/PUSCH in a first slot and a second PDSCH/PUSCH in a second slot. The multi-PDSCH/PUSCH component 198 may be further configured to receive the first PDSCH in a first set of symbols in the first slot and receive the second PDSCH in a second set of symbols in the second slot and/or to transmit the first PUSCH in a first set of symbols in the first slot and transmit the second PUSCH in a second set of symbols in the second slot, based on the resource allocation indicated in the DCI.

A base station 102 or 180 may include a multi-PDSCH/PUSCH grant component configured to transmit, to a UE 104, a single DCI indicating a multiple PDSCH/PUSCH grant for at least a first PDSCH/PUSCH in a first slot and a second PDSCH/PUSCH in a second slot. The base station 102 or 180 may be further configured to transmit the first PDSCH in a first set of symbols in the first slot and transmit the second PDSCH in a second set of symbols in the second slot and/or to receive the first PUSCH in a first set of symbols in the first slot and receive the second PUSCH in a second set of symbols in the second slot, based on the resource allocation indicated in the DCI.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
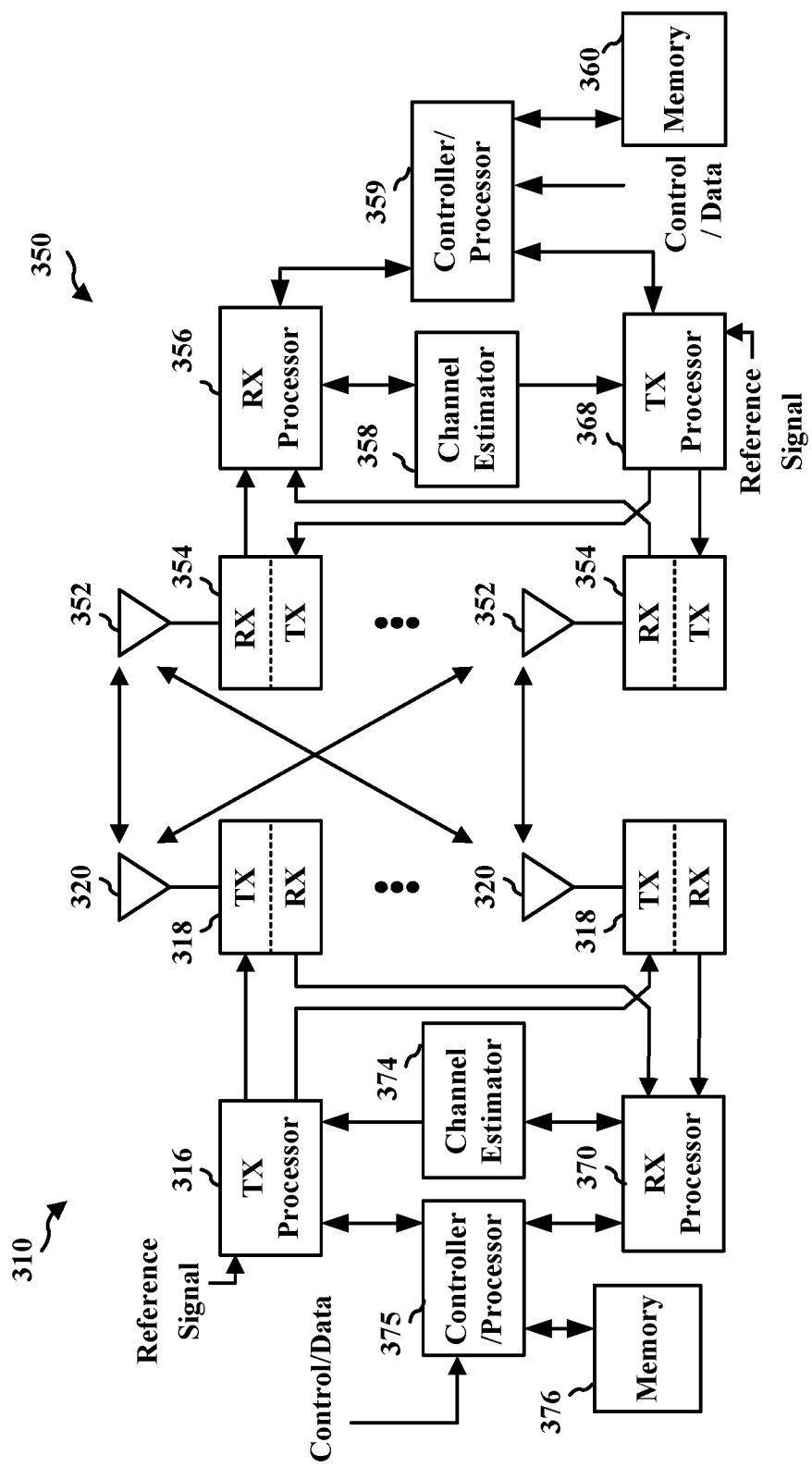
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the multi-PDSCH/PUSCH component 198 of FIG. 1.

At least one of the TX processor 316, the RX processor 370, and the controller/processor 375 may be configured to perform aspects in connection with the multi-PDSCH/PUSCH grant component 199 of FIG. 1.

A base station, or a component of a base station, may provide a UE with a single downlink control information (DCI) to schedule multiple PDSCH transmissions to the UE (e.g., multiple downlink (DL) TBs) or multiple PUSCH transmissions from the UE (e.g., multiple uplink (UL) TBs). In some aspects, the resource allocation may be across multiple slots. The single DCI may reduce the control signaling overhead and/or may reduce monitoring and processing of scheduling PDCCH at the UE. As an example, a UE may avoid monitoring for and/or processing scheduling PDCCH in each slot if the base station provides the UE with a single DCI that allocates resources in multiple slots. As used herein, a "single DCI" refers to one DCI message, e.g., one control message within a PDCCH transmission, that may include multiple parameters relating to control information to the UE.

In higher frequency bands, such as a frequency band above 52.6 GHz, there may be added phase noise and/or may have a wider available bandwidth for wireless communication. A higher SCS may be used for the wireless communication to reduce phase noise and/or to utilize the wider available bandwidth. A higher SCS corresponds to shorter symbol and slot durations. The single DCI scheduling multiple PDSCH transmissions or multiple PUSCH transmissions may reduce overhead and/or may improve scheduling for shorter slot durations associated with a higher SCS.

While multiple PDSCH/PUSCH scheduling DCI may reduce overhead, the DCI may schedule long periods of traffic in a single direction. For example, a single DCI allocating resources for multiple PDSCH occupying consecutive slots provides a long burst of downlink traffic without resources for uplink traffic. Likewise, a single DCI allocating resources for multiple PUSCH occupying consecutive slots provides a long burst of uplink traffic without occasion for downlink traffic. Some wireless communication may be associated with low-latency requirements for both uplink and downlink traffic, which may not be provided if resources are allocated for one direction of traffic over contiguous resources in multiple slots.

Multiple PDSCH/PUSCH scheduling over non-contiguous sets of resources allows for downlink and uplink traffic between the UE and the base station to be interlaced in time, e.g., enabling the UE to switch between uplink and downlink traffic, while still providing the reduced DCI control overhead and control monitoring through use of a single DCI. In some aspects, the interlaced uplink and downlink traffic may enable the UE to meet latency requirements of low-latency communication in both the uplink and downlink directions. In some aspects, switching between downlink and uplink traffic may involve a switching time at the UE of 7 μs, which corresponds to 7 symbols for 960 kHz SCS, which means that half of a 14 symbol slot is used for switching directions of communication at the UE.

In some aspects, a multi-PDSCH grant with a single DCI may be transmitted for a SCS of 480 kHz or 960 kHz. In some aspects, a multi-PDSCH grant with a single DCI may be transmitted for a SCS of 120 kHz or for other SCS. A multi-PUSCH grant with a single DCI may be provided for a SCS of 120 kHz, 480 kHz, or 960 kHz, among other examples. The time domain resource allocation for the multiple PUSCH or multiple PDSCH may be non-contiguous and may include a gap in time between different PDSCH allocations or between different PUSCH allocations granted by the same DCI.

In some aspects, the multi-PDSCH/PUSCH DCI may indicate the allocated resources based on a time domain resource allocation (TDRA) table. Table 1 illustrates an example TDRA table. Table 1 is merely an example of a TDRA table to illustrate the concept, and a DCI grant may be based on any of various TDRA tables.

For a single DCI that schedules multiple PUSCHs, the TDRA table may include entries such that each row indicates up to 8 multiple PUSCHs (that may be non-continuous in time-domain). Each PUSCH may have a separate start and length indicator value (SLIV) and mapping type. The number of scheduled PUSCHs may be implicitly indicated by the number of indicated valid SLIVs in the row of the TDRA table signalled in DCI. For a DCI that can schedule multiple PDSCHs, the TDRA may include entries such that each row indicates up to 8 multiple PDSCHs (that may be non-continuous in a time-domain). Each PDSCH may have a separate SLIV and mapping type. The number of scheduled PDSCHs may be implicitly indicated by the number of indicated valid SLIVs in the row of the TDRA table signalled in DCI. The DCI may indicate multiple PUSCH/PDSCH grants that are continuous resource in a time-domain or that are non-continuous in the time domain. The multiple SLIVs for a particular index of the TDRA table may be indicated in various ways. For example, each row may use S, L columns or may use SLIV values. Regardless of the way in which the multiple SLIVs are indicated, one row index may correspond to multiple SLIVs.

TABLE 1

| row index | PUSCH mapping type | K2 | SLIV |
|---|---|---|---|
| 0 | Type A | (0 ... 32) | (0 ... 127), (0 ... 127) |
| 1 | Type B | (0 ... 32) | (0 ... 127) ... , (0 ... 127) |

As illustrated, each row of the TDRA table may row indicate resource allocations for multiple PUSCHs or for multiple PDSCHs, e.g., two to eight PUSCHs/PDSCHs. For PUSCH, each row of the TDRA table may indicate a corresponding $K_2$ parameter that indicates the slot where UE is to transmit the first PUSCH of the multiple PUSCHs. For example, $K_2$ may indicate a time period between the DCI and the slot for the transmission of the first PUSCH. For PDSCH, each row of the TDRA table may indicate a corresponding $K_0$ parameter that indicates the slot where UE is to receive the first PDSCH of the multiple PDSCHs. Each PUSCH/PDSCH may have a separate SLIV and mapping type. The number of scheduled PUSCHs/PDSCHs may be indicated by the number of indicated valid SLIVs in the row indicated by an index indicated in the scheduling DCI. As an example, a TDRA for continuous multi-PUSCH may be signalled to the UE for multi-PUSCH DCI in pusch-TimeDomainAllocationListForMultiPUSCH. Aspects presented herein provide for multi-PDSCH/PUSCH resource allocation by a single DCI to allocation non-continuous resources, e.g., having a time gap between PDSCH/PUSCH allocations.

In some aspects, the TDRA table may indicate a single $K_0$ parameter.

Figure 4:
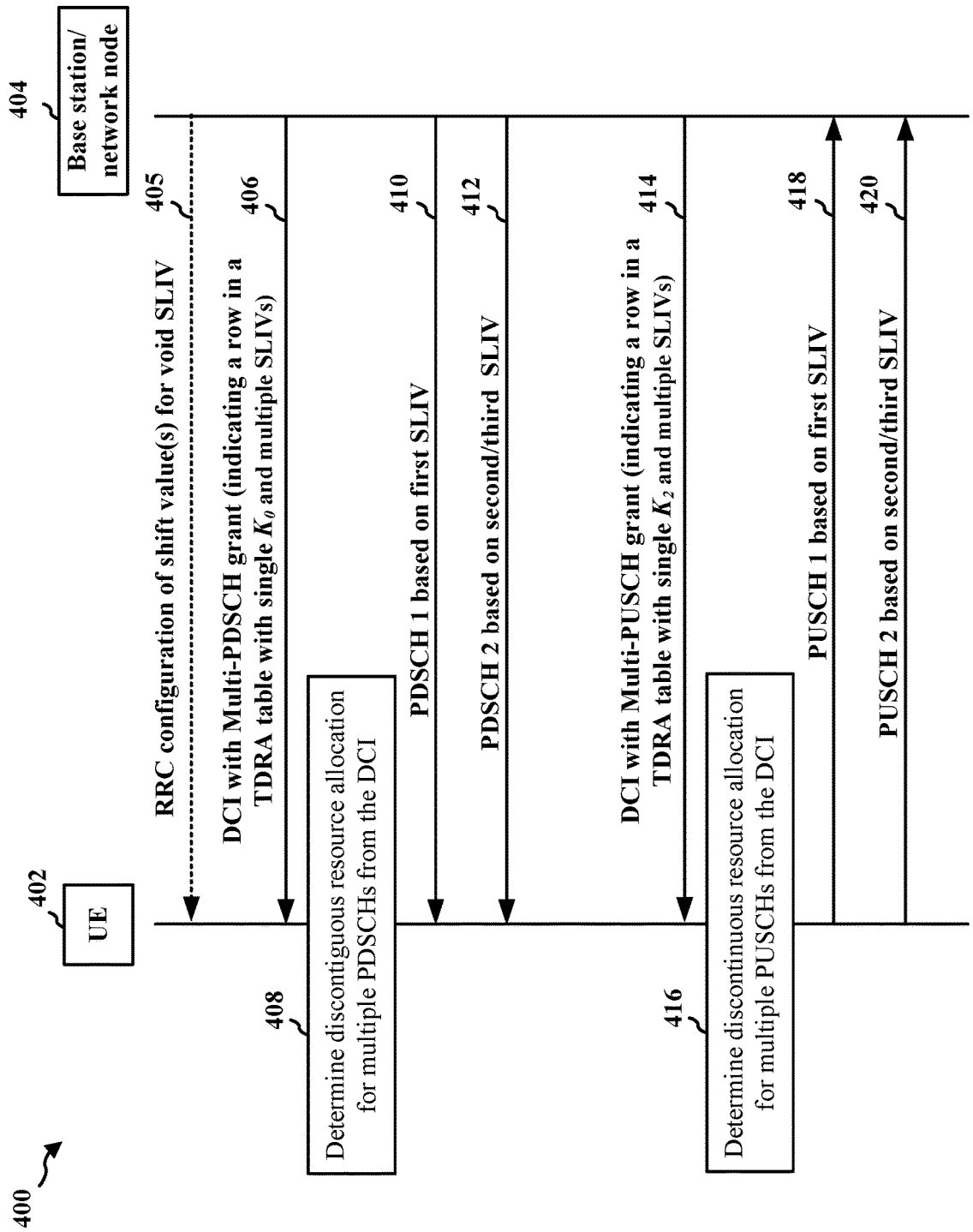
FIG. 4 illustrates an example communication flow between a UE and a base station including a DCI scheduling multiple PDSCH/PUSCH grants.
Figure 5:
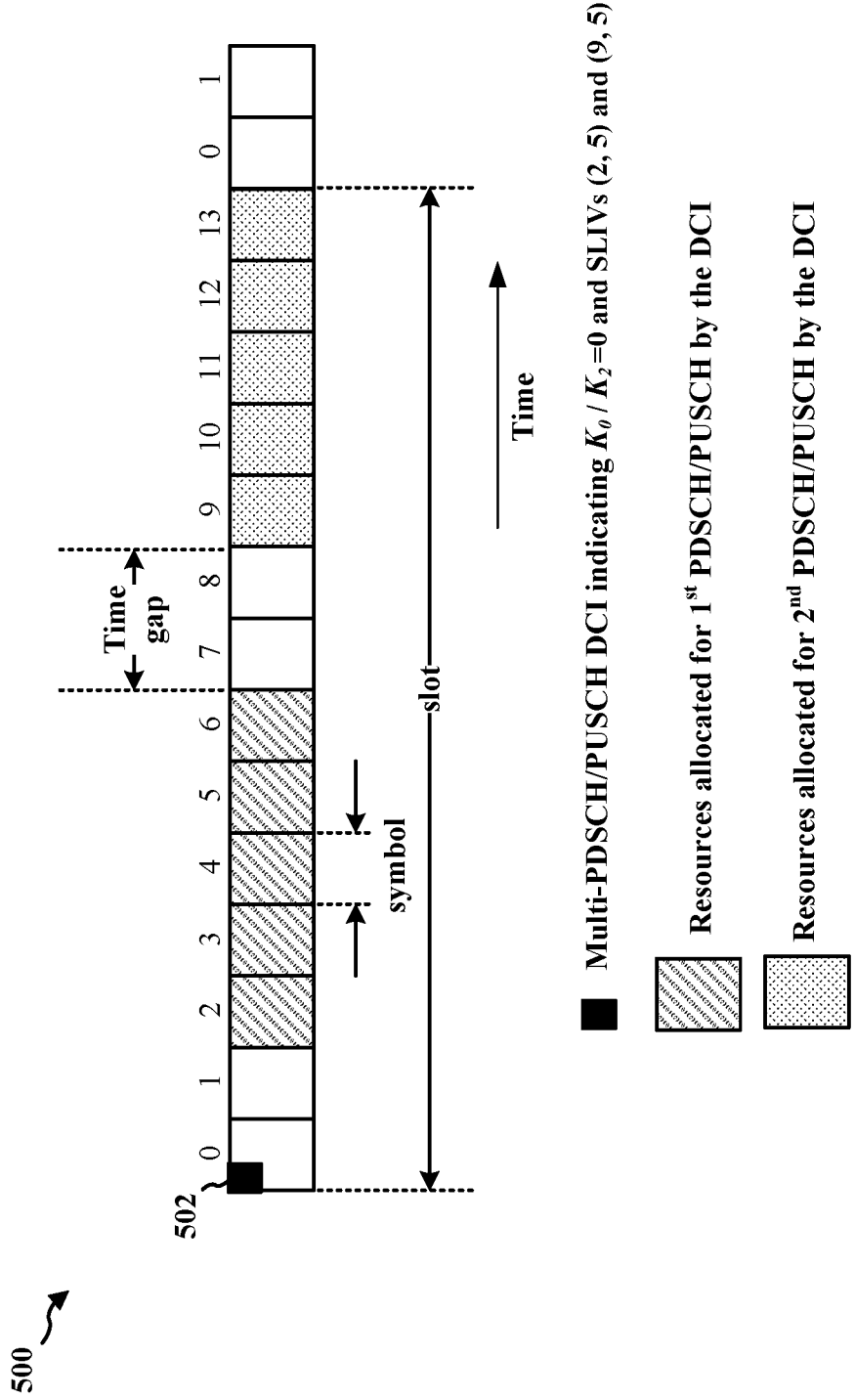
FIG. 5 illustrates an example time diagram showing non-contiguous PDSCH/PUSCH allocations based on a single DCI.

FIG. 4 illustrates an example communication flow 400 between a UE 402 and a base station 404 including a single DCI that schedules multi-PDSCH or multi-PUSCH resources. Although the example is described for a UE and a base station, in other aspects, 404 may be a network entity or network node or network entity. A node can be implemented as a base station (i.e., an aggregated base station), as a disaggregated base station, an integrated access and backhaul (IAB) node, a relay node, etc. Similarly, a network entity can be implemented as a base station (i.e., an aggregated base station), or alternatively, as a CU, a DU, a RU, a Near-RT RIC, or a Non-RT RIC in a disaggregated base station architecture. The base station transmits DCI 406 to the UE 402 scheduling resources for multiple PDSCH having non-contiguous resources between PDSCH. Multiple PDSCH refers to multiple downlink TBs. The UE 402 receives the DCI and determines the non-contiguous resource allocation for the multiple PDSCHs. For example, the DCI may indicate a row of a TDRA table that corresponds to a single $K_0$ value for each of the PDSCHs and that includes multiple SLIVs. For example, the indicated row may have $K_0$=0 and SLIV 1 of (S, L)=(2, 5) and SLIV 2 of (S, L)=(9, 5). $K_0$ indicates a slot of the resource allocation relative to the DCI scheduling the PDSCH. S corresponds to a starting symbol of the resource allocation relative to a first symbol of the slot indicate by $K_0$ and L corresponds to a length of the resource allocation in symbols. The UE 402 receives the PDSCH 1 410 based on the first SLIV of the TDRA table row and receives the PDSCH 2 412 based on the second SLIV of the TDRA table row. FIG. 5 illustrates an example time resource diagram 500 showing a DCI 502 that is transmitted from the base station to the UE in a first symbol of a slot. The DCI 502 may correspond to the DCI 406 or 414 in FIG. 4. The DCI 502 may indicate a TDRA row index for a row having $K_0$=0 and SLIV 1 of (S, L)=(2, 5) and SLIV 2 of (S, L)=(9, 5). $K_0$=0 means that the PDSCH resources are allocated based on the slot in which the DCI is received. $K_0$=1 would indicate that the starting symbol S of the allocation is relative to the slot following the slot in which the DCI is received. The SLIV 1 of (S, L)=(2, 5) indicates a resource allocation for the first PDSCH from symbol 2 to symbol 6 (e.g., having a length L=5 symbols. The SLIV 2 of (S, L)=(9, 5) indicates a resource allocation for the second PDSCH from symbol 9 for a length of 5 contiguous symbols to symbol 13 of the slot.

Although FIG. 5 is described for the example of multi-PDSCH scheduled in a single DCI, the aspects may similarly apply for multi-PUSCH scheduled in a single DCI. As illustrated in FIG. 4, the UE 402 may receive a single DCI 414 from the base station 404 scheduling resource for multiple PUSCH transmissions from the UE. Multiple PUSCH refers to multiple UL TBs. Similar to the DCI 406, the DCI 414 may indicate a row in a TDRA table having a single $K_2$ value for each of the PUSCHs and that includes multiple SLIVs. For example, the indicated row may have $K_2$=0 and SLIV 1 of (S, L)=(2, 5) and SLIV 2 of (S, L)=(9, 5), which corresponds to the example illustrated in FIG. 5 if the DCI schedules PUSCH resources rather than PDSCH resources.

The example in FIG. 5 illustrates symbols 7 and 8 of the slot as providing a time gap between the PDSCH/PUSCH transmissions. However, the TDRA table may provide a symbol level gap of one or more symbols without providing a way to indicate a slot level gap (e.g., of one or more slots) in time. Larger SCSs may correspond to smaller symbol durations, and a switching time for a UE to switch between downlink and uplink traffic (e.g., switching from a downlink beam to an uplink beam) may consume one or more symbols. In order to exchange traffic in a different direction, the UE may use one or more symbols to change between transmission and reception, one or more symbols to exchange communication, and one or more symbols to switch back between transmission and reception. Aspects presented herein provide for larger gaps in time between multiple PDSCH/PUSCH resource allocations provided in a single DCI, which may enable improved use of time gaps between the resource allocations to monitor/transmit/receive communication in an opposite traffic direction between the allocated resources.

In some aspects, the SLIVs in a row of a TDRA table may indicate overlapping resource allocations, which the UE may interpret to mean that the later SLIV corresponds to a subsequent slot to the slot of the first SLIV. For example, the DCI 406 in FIG. 4 may indicate a row of a TDRA table having a single $K_0$ value and multiple SLIVs. As an example of overlapping resources indicated by two SLIVs, the indicated row may have $K_0$=0 and SLIV 1 of (S, L)=(1, 4) and SLIV 2 of (S, L)=(4, 5). $K_0$=0 means that the PDSCH resources are allocated based on the slot in which the DCI is received. The SLIV 1 of (S, L)=(1, 4) indicates a resource allocation for the first PDSCH from symbol 1 to symbol 4 (e.g., having a length L=4 symbols. The SLIV 2 of (S, L)=(4, 5) indicates a resource allocation for the second PDSCH from symbol 4 for a length of 5 contiguous symbols to symbol 8. As the first SLIVs indicate that symbol 4 is allocated for both the first PDSCH and the second PDSCH, the UE may determine, at 408, that SLIV 2 is for symbols 4-8 of a subsequent slot. Similarly, if the DCI 414 indicates a TDRA row with $K_0$=0 and SLIV 1 of (S, L)=(1, 4) and SLIV 2 of (S, L)=(4, 5), the UE may determine, at 416, that the PDSCH 1 418 resource allocation is for symbols 1-4 of the slot in which the DCI 414 was received and the resource allocation for PDSCH 2 420 is for symbols 4-8 of a subsequent slot.

Figure 6:
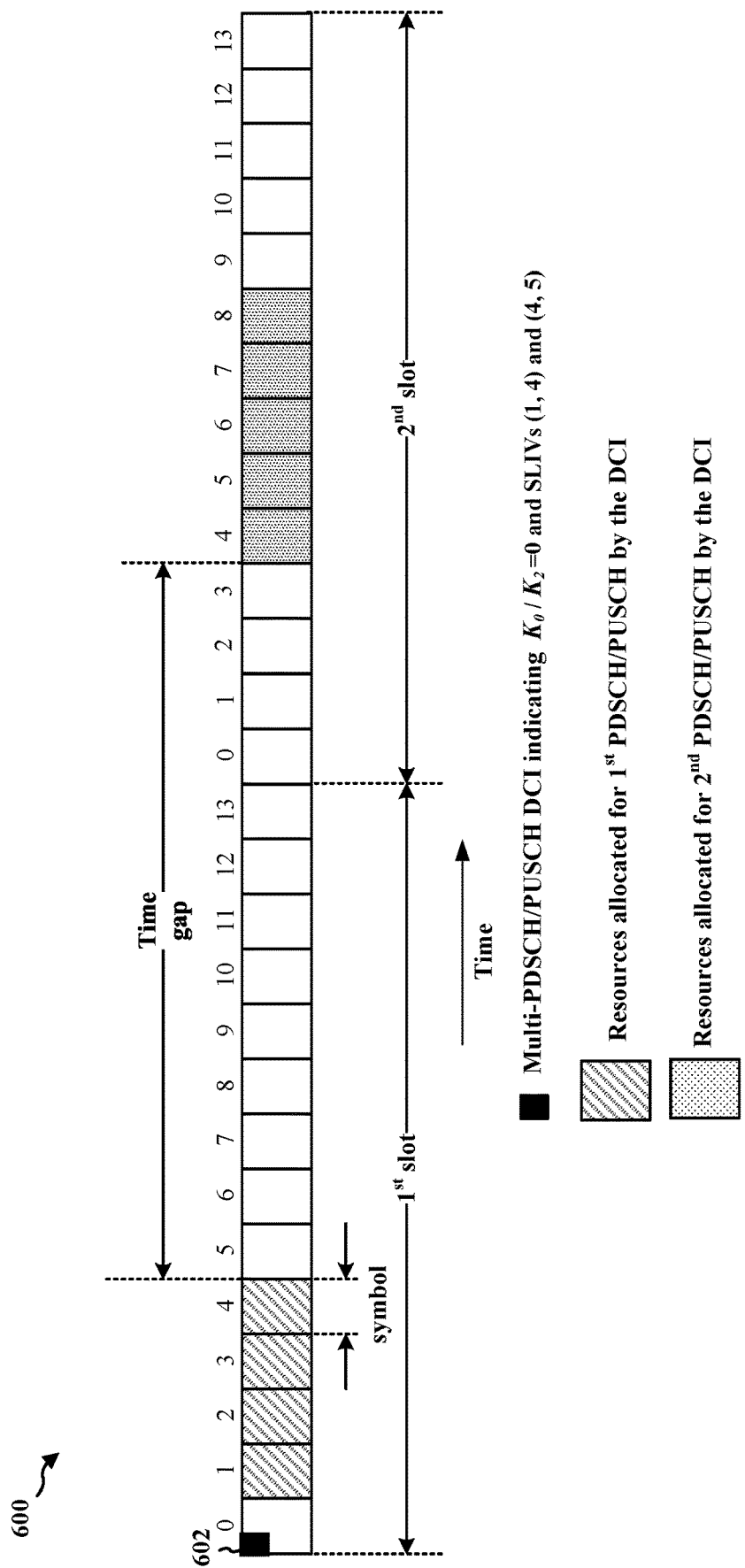
FIG. 6 illustrates an example time diagram showing non-contiguous PDSCH/PUSCH allocations based on a single DCI.

FIG. 6 illustrates an example time diagram 600 showing DCI 602 that indicates a row in a TDRA table for $K_0$=0 (for a DCI scheduling multiple PDSCH) or $K_2$=0 (for a DCI scheduling multiple PUSCH) and SLIV 1 of (S, L)=(1, 4) and SLIV 2 of (S, L)=(4, 5) and the corresponding allocation of resources in different slots based on the overlap indicated by the SLIVs. The DCI 602 may correspond to the DCI 406 or 414 in FIG. 4. The use of overlapping SLIVs to indicate that one of the resource allocations begins in a subsequent slot, e.g., as shown in FIG. 6, provides for at most a time gap of 13 symbols. The example illustrated in FIG. 6 provides for an implicit indication of a resource allocation starting in a different slot, e.g., with only a single $K_0$ or $K_2$ indicated in the TDRA row.

In some aspects, the SLIVs in a row of a TDRA table and having a single $K_0$ or $K_2$ value may indicate resource allocations in different slots in a different manner than having overlapping SLIVs. As an example, an SLIVs may indicate void resources, an empty resource allocation, a non-allocation of resources, etc., and may be interpreted by the UE as an indication of a slot level shift between resource allocations of the adjacent SLIVs. For example, the DCI 406 in FIG. 4 may indicate a row of a TDRA table having a single $K_0$ value and multiple SLIVs, one of which is a void SLIV. FIGS. 7A and 7B illustrate example time resource diagrams 700 and 750 showing DCI 702 that indicates a TDRA row index for a row having $K_0$=0 (for a DCI scheduling multiple PDSCH) or $K_2$=0 (for a DCI scheduling multiple PUSCH) and SLIV 1 of (S, L)=(1, 4), SLIV 2 of (0) and SLIV 3 of (S, L)=(4, 5) and the corresponding allocation of resources in different slots based on the void SLIV 2. The DCI may correspond to DCI 406 or 414 in FIG. 4. An SLIV=0 may be considered void, or a void SLIV may be indicated in another manner. Based on SLIV=0, or otherwise being indicated as a void SLIV, the UE may determine (e.g., at 408 or 416) that the SLIV 1 corresponds to symbols 1-4 of the slot in which the DCI 702 was received, and the SLIV 3 corresponds to symbols 9-13 of a different slot, e.g., based on a slot shift indicated by the void SLIV 2. The shift may correspond to a single slot, as shown in FIG. 7A so that the UE determines the SLIV 3 corresponds to symbols 9-13 of the next slot after the slot in which the DCI 702 is received. In some aspects, the slot shift may correspond to more than 1 slot. For example, FIG. 7B illustrates an example in which the UE may interpret the void SLIV to indicate a shift of two slots so that SLIV 3 has a starting symbol from the start of a second slot after the slot in which the DCI 702 was received. Although the example is shown for a slot shift of 2 slots, the UE may interpret the slot shift to be any number of slots, e.g., 1, 2, 3, 4 or more slots. In some aspects, the slot shift based on a void SLIV may be indicated to the UE. For example, at 405 in FIG. 4, the UE may receive an RRC configuration of a shift value (e.g., 1 slot, 2 slots, 3 slots, etc.) corresponding to a void SLIV for DCI scheduling multiple PDSCH/PUSCH. In some aspects, the shift value may be defined, such as in a wireless standard, or may be otherwise known/applied by the UE without signaling from the base station. In some aspects, the interpretation of the void SLIV indicated by a DCI scheduling multiple PDSCH/PUSCH may be based on SCS. In some aspects, the SCS may be the SCS for the scheduled PDSCH/PUSCH. For example, the UE may apply a shift of a first number of slots (e.g., a 1 slot shift to the subsequent slot) to the resource allocation for the SLIV 3 if the scheduled PDSCH/PUSCH has a SCS of 480 kHz and may apply a shift of a second number of slots (e.g., a 2 slot shift) to the resource allocation for the SLIV 3 if the scheduled PDSCH/PUSCH has an SCS of 960 kHz. The UE may apply a third shift value for a third SCS. The shift values to be applied for different SCS may be signaled to the UE by the base station, e.g., in RRC signaling. In some aspects, the shift values to be applied for different SCS may be defined, such as in a wireless standard, or may be known by a UE without signaling from the base station.

Figure 8:
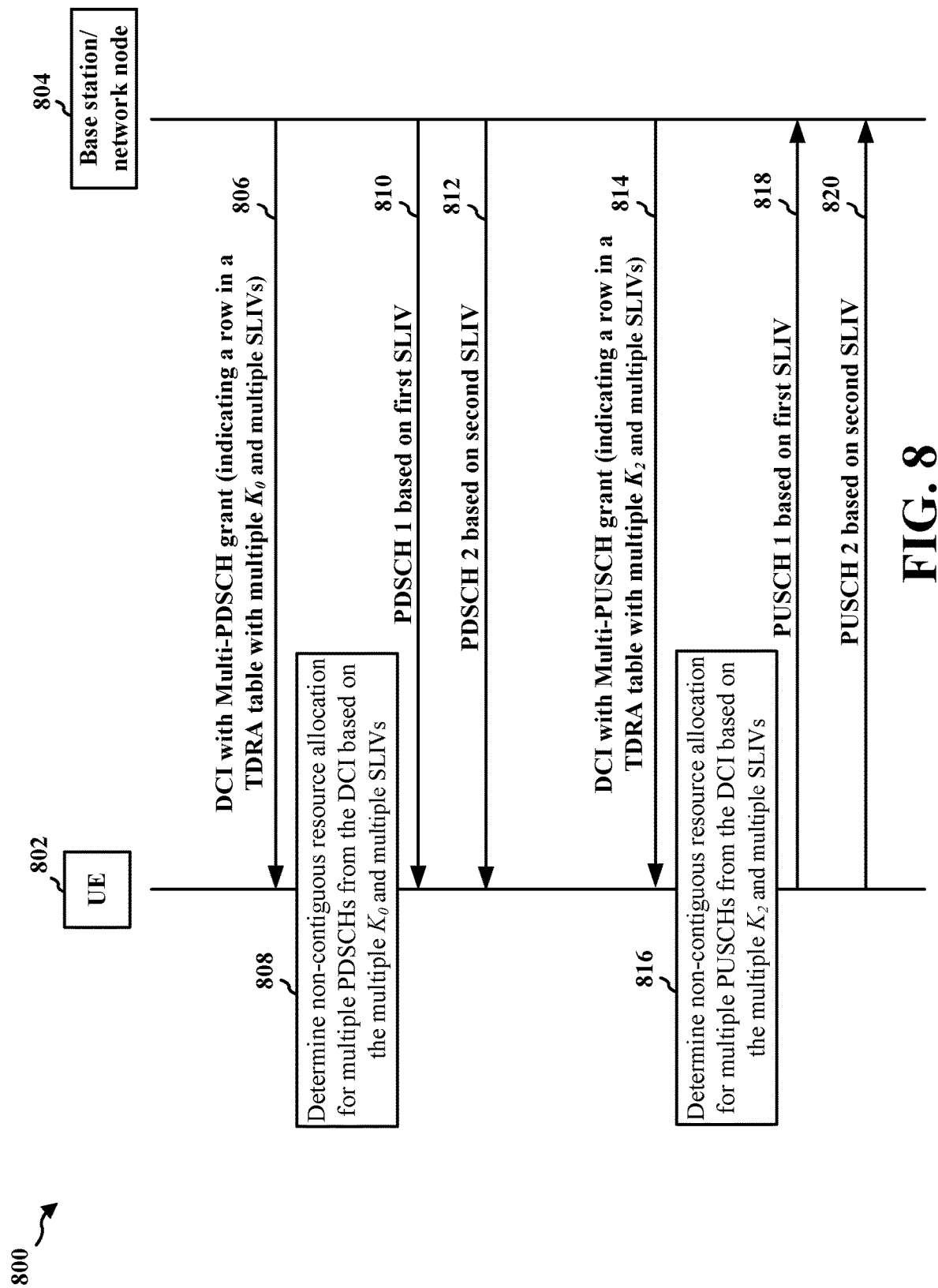
FIG. 8 illustrates an example communication flow between a UE and a base station including a DCI scheduling multiple PDSCH/PUSCH grants.

In some aspects, the TDRA table referenced in the DCI may include multiple $K_0/K_2$ values and multiple SLIVs. FIG. 8 illustrates a communication flow 800 between a UE 802 and a base station 804. Although the example is described for a UE and a base station, in other aspects, 804 may be a network entity or network node or network entity. A node can be implemented as a base station (i.e., an aggregated base station), as a disaggregated base station, an integrated access and backhaul (IAB) node, a relay node, etc. Similarly, a network entity can be implemented as a base station (i.e., an aggregated base station), or alternatively, as a CU, a DU, a RU, a Near-RT RIC, or a Non-RT RIC in a disaggregated base station architecture. The communication flow includes an example of single DCI 806 scheduling multiple, non-contiguous resources for PDSCH and a single DCI 814 scheduling multiple, non-contiguous resources PUSCH. For example, the row in the TDRA table that is indicated in the DCI 806 may include M values for $K_0$, M being an integer of 2 or more. The information in the TDRA table, e.g., including the M values for $K_0$ may be configured for the UE, e.g., in RRC signaling from the base station 804. If the DCI 806 indicates a row in the TDRA table that has the same number of values for $K_0$ as the number of SLIVs, the UE may apply, at 808, one of the M $K_0$ values to each of the SLIV resource allocations, e.g., in a 1-to-1 manner. For example, if the DCI 806 indicates $K_0$=0.2 and SLIV 1 of (S, L)=(1, 4) and SLIV2 of (S, L)=(9, 5), the UE 802 may determine, at 808, that the resource allocation for the PDSCH 1 810 corresponds to symbols 1-4 of the slot in which the DCI 806 was received and the resource allocation for the PDSCH 2 812 corresponds to symbols 9-13 in a second slot after the slot in which the DCI 806 was received.

Similarly, if the UE receives DCI 814 indicating $K_2$=0.2 and SLIV 1 of (S, L)=(1, 4) and SLIV2 of (S, L)=(9, 5), the UE 802 may determine, at 816, that the resource allocation for the PUSCH 1 818 corresponds to symbols 1-4 of the slot in which the DCI 814 was received and the resource allocation for the PUSCH 2 820 corresponds to symbols 9-13 in a second slot after the slot in which the DCI 814 was received.

FIG. 9A illustrates a time resource diagram 900 for DCI 902 indicating either $K_0$=0.2 (e.g., for DCI scheduled multiple PDSCH) or $K_2$=0.2 (e.g., for DCI scheduled multiple PDSCH) and SLIV 1 of (S, L)=(1, 4) and SLIV2 of (S, L)=(9, 5). FIG. 9A illustrates the resource allocation for the PUSCH 1 corresponds to symbols 1-4 of the slot in which the DCI 902 was received (e.g., slot 1) and the resource allocation for the PUSCH 2 corresponds to symbols 9-13 in a second slot (e.g., slot 3) after the slot in which the DCI 902 was received.

If the number, e.g., M, of the multiple $K_0/K_2$ values is less than the multiple SLIVs indicated by the DCI, e.g., in a row of a TDRA table referenced in the DCI, the UE may group the SLIVs into multiple groups and may apply one of the $K_0/K_2$ values to each of the groups. For example, the number of groups may be based on the number of SLIVs/M. In some aspects, one of the groups, e.g., a last group, of SLIVs may have a smaller number of SLIVs, e.g., if the number of SLIVs/M is not an integer number. In this example, the UE applies each slot offset ($K_0/K_2$ values) to a group of SLIVs.

FIG. 9B illustrates a time resource diagram 950 for DCI 904 indicating either $K_0$=0.2 (e.g., for DCI scheduled multiple PDSCH) or $K_2$=0.2 (e.g., for DCI scheduled multiple PDSCH) and SLIV 1 of (S, L)=(1, 4); SLIV 2 of (S, L)=(7, 3); SLIV 3 of (S, L)=(1, 4); and SLIV 4 of (S, L)=(9, 5). FIG. 9B illustrates the resource allocation for the PUSCH 1 corresponds to symbols 1-4 and the resource allocation for the PUSCH 2 corresponds to symbols 7-9 of the slot in which the DCI 904 was received (e.g., slot 1) and the resource allocation for the PUSCH 3 corresponds to symbols 1-4 and PUSCH 4 corresponds to symbols 9-13 in a second slot (e.g., slot 3) after the slot in which the DCI 904 was received.

Figure 10:
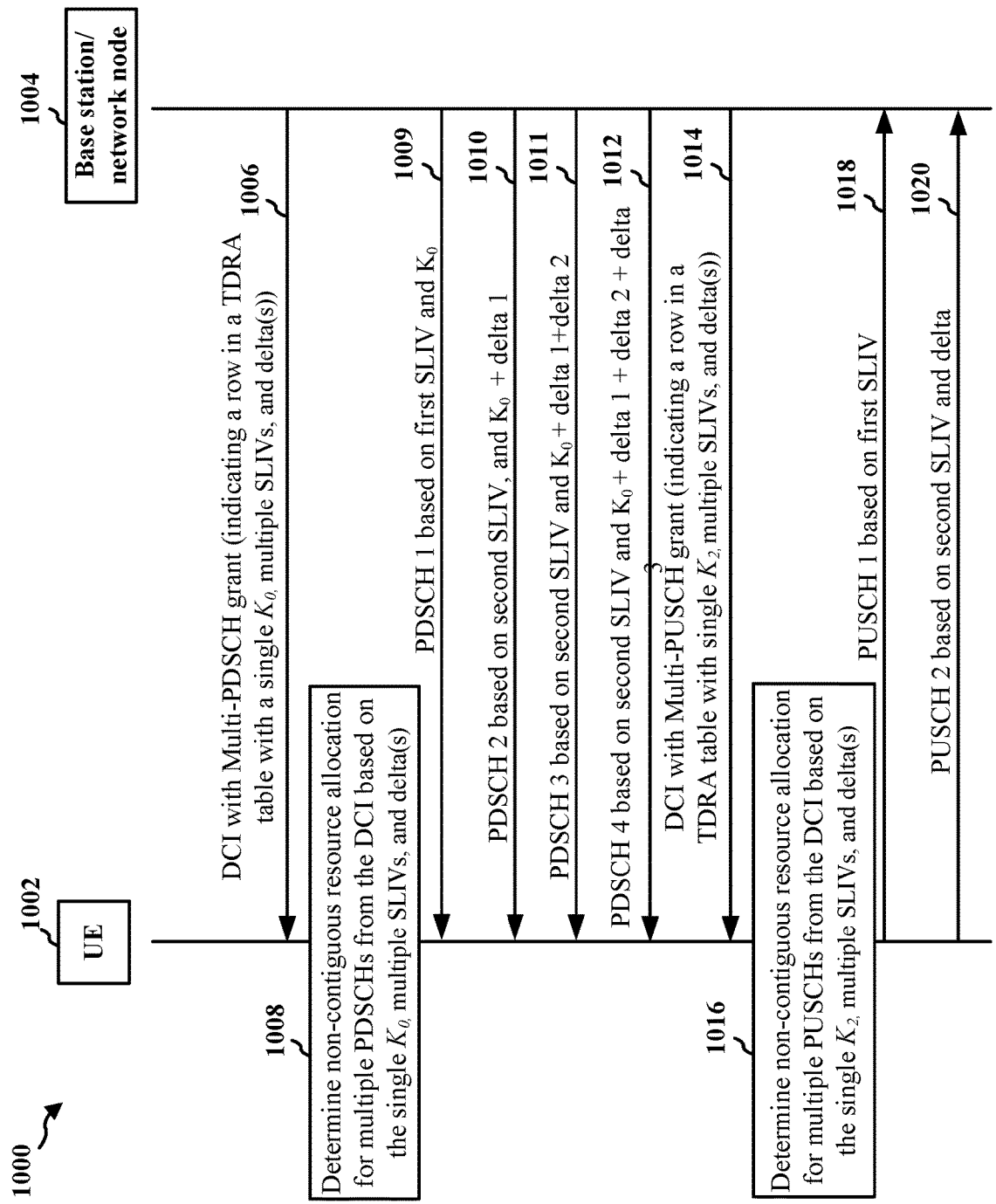
FIG. 10 illustrates an example communication flow between a UE and a base station including a DCI scheduling multiple PDSCH/PUSCH grants.

In some aspects, the UE may receive a DCI scheduling that indicates a row of a TDRA table having single $K_0/K_2$ value, multiple SLIVs, and one or more deltas to define a slot offset based on the $K_0/K_2$ value. FIG. 10 illustrates a communication flow 1000 between a UE 1002 and a base station 1004. Although the example is described for a UE and a base station, in other aspects, 1004 may be a network entity or network node or network entity. A node can be implemented as a base station (i.e., an aggregated base station), as a disaggregated base station, an IAB node, a relay node, etc. Similarly, a network entity can be implemented as a base station (i.e., an aggregated base station), or alternatively, as a CU, a DU, a RU, a Near-RT RIC, or a Non-RT RIC in a disaggregated base station architecture. The communication flow includes an example of single DCI 1006 scheduling multiple, non-contiguous resources for PDSCH and a single DCI 1014 scheduling multiple, non-contiguous resources PUSCH. For example, the row in the TDRA table that is indicated in the DCI 1006 may include a single value for $K_0$ or $K_2$ and multiple SLIVs. The row of the TDRA table may indicate one or more deltas for a slot offset based on the $K_0$ or $K_2$ value. If the DCI 1006 indicates a row in the TDRA table that has a number of SLIVs that is one more than the indicated deltas, the UE may apply, at 1008 or 1016, the delta values progressively to each of the SLIV resource allocations after the first SLIV. For example, if the DCI 1006 indicates $K_0=0$ and SLIV 1 of (S, L)=(1, 4); SLIV 2 of (S, L)=(9, 5); SLIV 3 of (S, L)=(1, 4); and SLIV 4 of (S, L)=(9, 5), the UE 1002 may determine, at 1008, that the resource allocation for the PDSCH 1 1009 corresponds to symbols 1-4 of the slot in which the DCI 1006 was received (e.g., $K_0=0$ with no delta) and the resource allocation for the PDSCH 2 1010 corresponds to symbols 9-13 in the slot in which the DCI 1006 was received (e.g., based on $K_0=0$+the first delta=$K_0$+0). The UE 1002 may determine that the resource allocation for the PUSCH 3 1011 corresponds to symbols 1-4 in a third slot (e.g., slot 4) after the slot in which the DCI 1014 was received (e.g., based on $K_0=0$+the first delta+the second delta=$K_0$+0+4) and that the resource allocation for PUSCH 4 1012 corresponds to symbols 9-13 in a third slot (e.g., slot 4) after the slot in which the DCI 1014 was received (e.g., based on $K_0=0$+the first delta+the second delta+third delta=$K_0$+0+4+0). Similarly, the UE 1002 may determine, at 1016, the resources for the PUSCH 1 1018 based on the corresponding SLIV 1 and $K_2$ in the TDRA table without a delta and may determine the resources for the PUSCH 2 1020 based on SLIV 2 and $K_2$ in the TDRA table and with a first delta indicated by the DCI.

FIG. 11A illustrates an example 1100 according to DCI 1102 that indicates $K_0=0$ and SLIV 1 of (S, L)=(1, 4); SLIV 2 of (S, L)=(7.3); SLIV 3 of (S, L)=(1, 4); and SLIV 4 of (S, L)=(9, 5) with delta=0, 4, 0. The DCI 1102 may correspond to the DCI 1006 or DCI 1014 in FIG. 10, in some aspects.

If the number of deltas is more than 1 less than the number of SLIVs, e.g., number of deltas<number of SLIV−1, the UE may group the SLIVs into multiple groups and may apply the deltas to a corresponding group of SLIVs. The number of groups of SLIVs may be based on the number of SLIVs−1/the number of deltas. In some aspects, one of the groups may have a fewer number of SLIVs, e.g., based on the number of SLIVs−1/number of deltas not being equal to an integer number. The slot offset per group may then be calculated based on the $K_0$ or $K_2$ value and the deltas. FIG. 11B illustrates an example 1150 similar to FIG. 11A in which only a single delta is indicated, e.g., delta=4, along with a single $K_0/K_2=0$ and four SLIVs, e.g., SLIV 1 of (S, L)=(1, 4); SLIV 2 of (S, L)=(7.3); SLIV 3 of (S, L)=(1, 4); and SLIV 4 of (S, L)=(9, 5) with delta=4. In FIG. 11B, SLIV1 and SLIV 2 may be grouped into a group (to which no delta is applied) and SLIV 3 and SLIV 4 may be grouped into a group to which the delta=4 is applied. DCI 1104 may correspond to the DCI 1006 or 1014 in FIG. 10.

Figure 12:
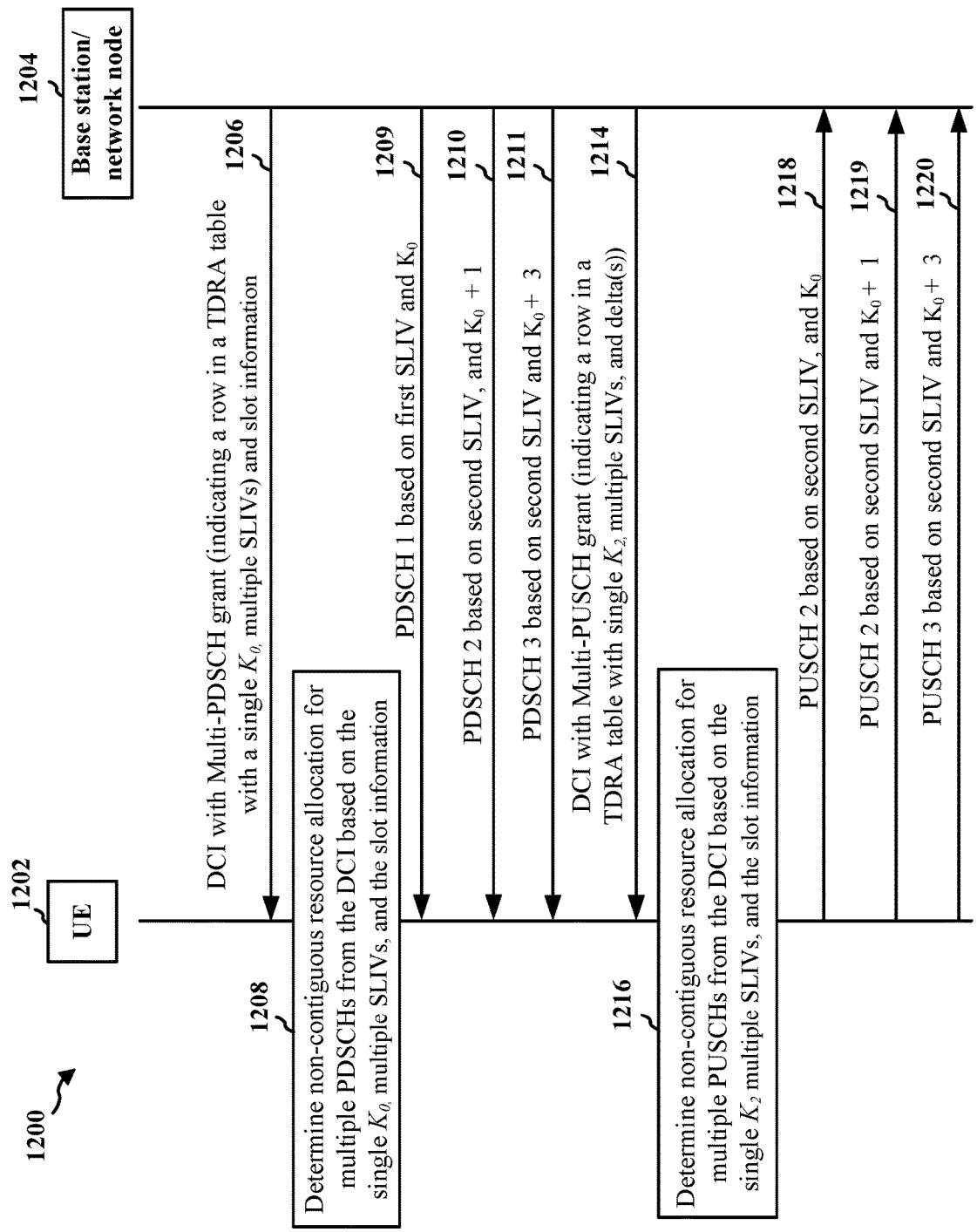
FIG. 12 illustrates an example communication flow between a UE and a base station including a DCI scheduling multiple PDSCH/PUSCH grants.

In some aspects, the UE may receive a DCI scheduling that indicates a row of a TDRA table having single $K_0/K_2$ value and multiple SLIVs. The DCI may include additional information that indicates the slots of the granted allocations, e.g., the slots in which the SLIVs are to be applied. FIG. 12 illustrates a communication flow 1200 between a UE 1202 and a base station 1204. Although the example is described for a UE and a base station, in other aspects, 1004 may be a network entity or network node or network entity. A node can be implemented as a base station (i.e., an aggregated base station), as a disaggregated base station, an IAB node, a relay node, etc. Similarly, a network entity can be implemented as a base station (i.e., an aggregated base station), or alternatively, as a CU, a DU, a RU, a Near-RT RIC, or a Non-RT RIC in a disaggregated base station architecture. The communication flow includes an example of single DCI 1206 scheduling multiple, non-contiguous resources for PDSCH and a single DCI 1214 scheduling multiple, non-contiguous resources PUSCH. For example, the row in the TDRA table that is indicated in the DCI 1206 or 1214 may include a single value for $K_0$ or $K_2$ and multiple SLIVs. The DCI 1206 or 1214 may further include information, which may be referred to as slot information, that indicates slots of the granted allocations. As one example, the DCI may include a bit map that indicates the slots of the granted allocation. The number of bits may indicate a number of slots spanned by the allocation. A 0 may indicate that no resources are allocated in the slot, and a 1 may indicate that one of the SLIVs is allocated in the corresponding slot. For example, a set of bits "1101" may indicate an allocation over 4 slots. The first SLIV has a first allocation at the slot based on the $K_0/K_2$, a second SLIV based on $K_0/K_2$ shifted by 1 slot (e.g., $K_0$+1 slot or $K_2$+1 slot), and a third SLIV based on $K_0/K_2$ shifted by 3 slots (e.g., $K_0$+3 slot or $K_2$+3 slot). The bit map "1101" indicates the SLIV 1 is allocated in the first slot, the SLIV 2 is allocated in the second slot, no allocations are made in the third slot, and the SLIV 3 is allocated in the fourth slot. The DCI may also indicate the particular slot for the SLIVs of the TDRA row in a different manner. In some aspects, the bitmap field size may be equal to a maximum number of PDSCHs/PUSCHs that can be granted by the same DCI. In the example of a bit map "1101," the maximum number of PDSCHs/PUSCHs that can be granted in a single DCI message is four. If the base station includes a grant for all four PDSCHs/PUSCHs, the bitmap may be "1111," and in an example in which the base station includes a grant for two PDSCHs/PUSCHs, the bitmap may be "1100," "1001," "1010," "0011," or "0101." The use of a common bitmap field size enables the DCI size to be fixed and known to the UE.

For example, if the DCI 1206 or 1214 indicates a TDRA table row with $K_0=0$ and SLIV 1 of (S, L)=(1, 4); SLIV 2 of (S, L)=(1, 4); SLIV 3 of (S, L)=(1, 4) and indicates a bitmap of "1101", the UE 1202 may determine, at 1208, that the resource allocation for the PDSCH 1 1209 corresponds to symbols 1-4 of the slot in which the DCI 1206 was received (e.g., $K_0=0$ is the first slot of the allocation) and the resource allocation for the PDSCH 2 1210 corresponds to symbols 1-4 in the slot after the slot in which the DCI 1206 was received (e.g., based on $K_0=0$+1 slot, e.g., the second slot of the allocation). The UE 1202 may determine that the resource allocation for the PUSCH 3 1211 corresponds to symbols 1-4 in a third slot (e.g., slot 4) after the slot in which the DCI 1206 was received (e.g., the fourth slot of the allocation). Similarly, the UE 1202 may determine, at 1216, the resources for the PUSCH 1 1218 based on the corresponding SLIV 1 and $K_2$ in the TDRA table in a slot in which the DCI 1214 was received, the resource allocation for the PUSCH 2 1219 corresponds to symbols 1-4 in the slot after the slot in which the DCI 1214 was received (e.g., based on $K_2=1$ slot, e.g., the second slot of the allocation). The UE 1202 may determine that the resource allocation for the PUSCH 3 1220 corresponds to symbols 1-4 in a third slot (e.g., slot 4) after the slot in which the DCI 1214 was received (e.g., the fourth slot of the allocation).

With gaps provided between scheduled PDSCHs, a single grant may allocate resources that span a long time duration. As an example, with a 2 slot gap, a grant for 8 PDSCHs may span 22 slots. In some aspects, a limit, or threshold, may be applied for PDSCH allocations that include time gaps. The base station may transmit DCI with allocations that satisfy the applicable limit or threshold.

Figure 20:
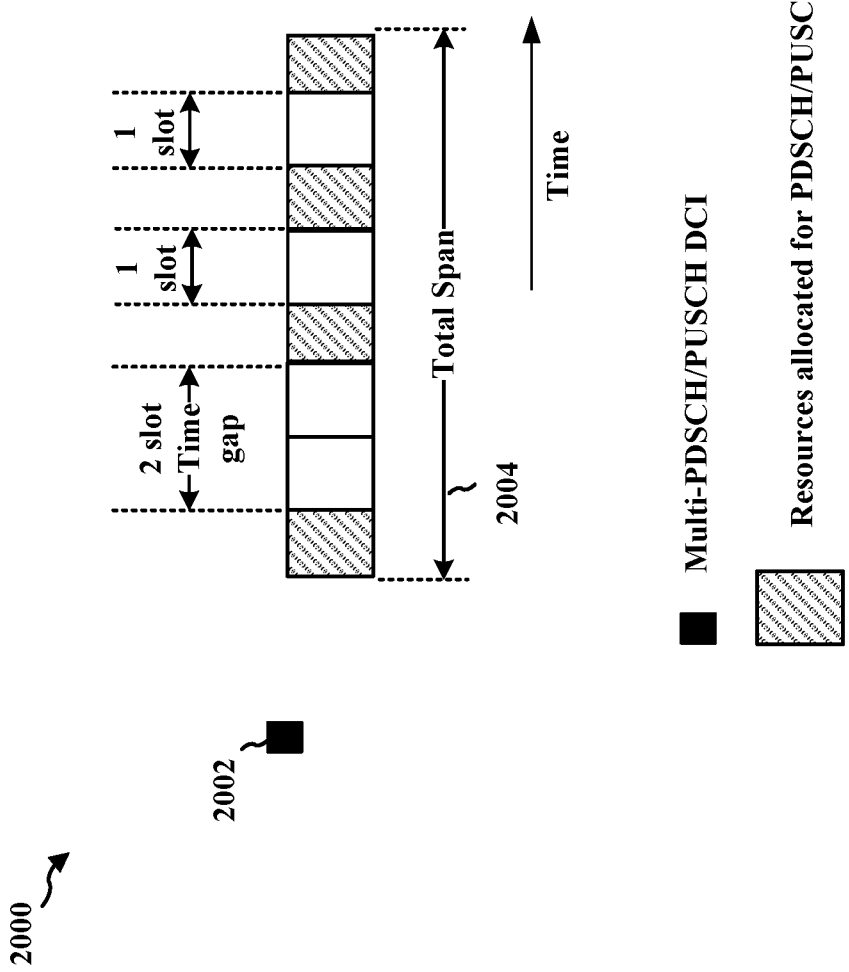
FIG. 20 illustrates an example time diagram showing non-contiguous PDSCH/PUSCH allocations based on a single DCI.

In some aspects, the multiple PDSCHs may be scheduled by a single DCI with a total time gap of up to a threshold number of slots. As an example, FIG. 20, shows a time diagram 2000 in which DCI 2002 schedules multiple PDSCH/PUSCH transmissions with various time gaps between the resources allocated for the multiple PDSCH/PUSCH. In this example, the total time gap is 4 slots, e.g., 2 slots+1 slot+1 slot. This example may be within a threshold of 4 total gap slots, or 5 total gap slots.

In some aspects, the limit or threshold may be a threshold size for each gap and/or a threshold number of gaps per grant. As an example, in FIG. 20, the size of each gap is 2 slots or less and would meet a threshold size per gap of 2 slots. In this example, the DCI may not schedule PDSCH/PUSCH separated by a time gap of 3 slots. As an example, in FIG. 20, the number of gaps scheduled by the DCI is 3, which would be within a limit/threshold of 3 gaps.

In some aspects, the limit or threshold may be based on a threshold span size that can be granted by a single DCI, including both data allocations and time gaps. FIG. 20 illustrates a span 2004 that includes both the data allocation, or scheduled PDSCH/PUSCH and time gaps scheduled by the single DCI 2002. In the example in FIG. 20, the total span may correspond to 8 slots, which may be within a limit/threshold of a total allocated span of 8 slots.

If the time gaps are indicated by an SLIV having a value of zero, or an invalid SLIV, as described in connection with FIG. 7A or 7B, the limit or threshold may be a threshold number of valid and/or invalid SLIVs in each row of a TDRA table.

The threshold/limit may be a value that is independent of the number of PDSCH/PUSCH per grant. In some aspects, the threshold/limit may be a fixed threshold. In some aspects, the threshold/limit may be based on, or related to, the number of PDSCH/PUSCH scheduled per grant, e.g., in a single DCI. As an example, a limit of a single gap may be applicable if 3 PDSCH are scheduled, whereas the limit may be 3 gaps if 8 PDSCH are scheduled. The different limit/threshold for different numbers of PDSCH/PUSCH scheduled by the DCI may be based on any of the example types of threshold described above (e.g., a total gap threshold, a threshold gap size of an individual time gap, a threshold number of gaps, or a threshold span size of the total allocation).

In some aspects, the limit or threshold may be based on a total span that cannot exceed a threshold of N*number of granted data allocations. N can be a positive number greater than or equal to 1. For example, if N=1.5, then 4 PDSCHs can span at most 6 slots, and 6 PDSCHs can span at most 9 slots. Alternatively, the total gap limit may have a threshold of M*number of granted data allocations, in which M can be any positive number. For example, M may be less than 1, such as M=0.5. In the example in which M=0.5, 4 PDSCH may span at most 2 slots, and 6 PDSCH may span at most 3 slots.

In some aspects, the base station may provide the UE with a slot map, and the single DCI may schedule the multiple PDSCH/PUSCH based on the previously received slot map. In some aspects, the base station may transmit, e.g., configure, the slot map to the UE in radio resource control (RRC) signaling. The base station may activate or deactivate a previously configured slot map in a DCI or MAC-CE transmission to the UE. For example, the base station may configure multiple slot maps for the UE in RRC signaling and may activate a particular slot map via DCI or a MAC-CE. In some aspects, the DCI scheduling the multiple PDSCH/PUSCH may reference a particular slot map that was previously configured.

The slot map may indicate a span of slots that correspond to a single DCI grant, including the gaps. For example, if the span of slots is 12 slots, the map may be 111001011101. As an example, a "1" in the map may indicate that the slot corresponds to one of the PDSCH/PUSCH allocations, and a "0" may indicate that the slot corresponds to a time gap in which no PDSCH/PUSCH is allocated by the DCI. In this example, a single DCI may indicate a row of a TDRA table that includes 8 SLIVs, which may be applied in order to the 8 slots for which the map indicates a "1" rather than a "0". For example, the PDSCH/PUSCH may be allocated to slots k0, k0+1, k0+2, k0+5, k0+7, k0+8, k0+9, k0+11 based on the slot map of 111001011101.

If the number of granted allocations is less than number of valid allocation in the slot map, then PDSCHs/PUSCHs may be allocated over the first set of slots or be shifted by configured offset. As an example, if the slot map is 1 1 1 0 0 1 0 1 1 1 0 1, a DCI that indicates a row of a TDRA table having 4 SLIVs, allocates the PDSCHs on slots k0, k0+1, k0+2, k0+5.

The slot map may be reconfigured, or updated, by a MAC-CE transmission from the base station.

In some aspects, the rate matching field in the DCI scheduling the multiple PDSCH/PUSCH may indicate the slot map. For example, the field may indicate or reference a previously configured slot map. If the rate matching field is used to indicate the slot map for a multiple PDSCH/PUSCH allocation, then either a rate matching pattern or a slot map may be configured/indicated by the DCI. In other aspects, the slot map may be indicated by a different field in the DCI. The use of a different field may enable the base station to indicate both a rate matching pattern and a slot map (for the indication of time gaps) for the multiple PDSCH/PUSCH allocation. In this example, a rate matching pattern may be applied on top of, or in combination with, the slot map for the multiple PSDCH/PUSCH being scheduled by the DCI.

Figure 13:
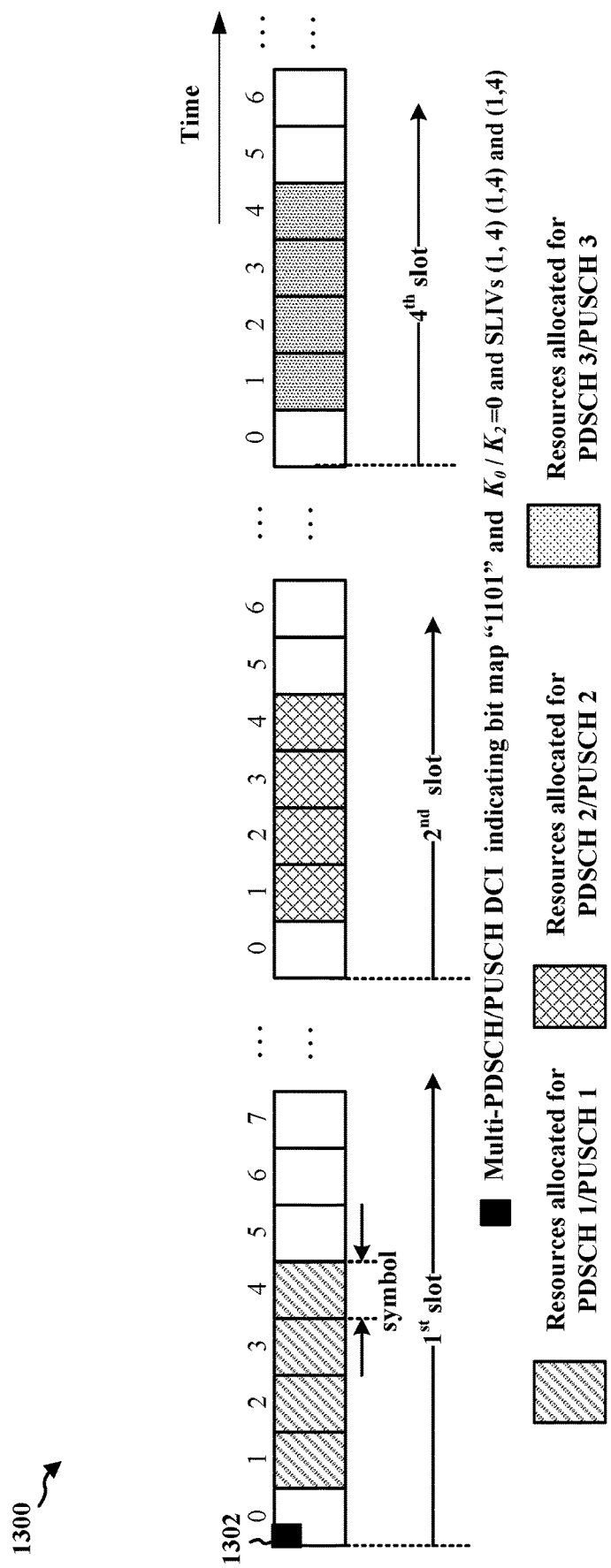
FIG. 13 illustrates an example time diagram showing non-contiguous PDSCH/PUSCH allocations based on a single DCI.

FIG. 13 illustrates an example time diagram 1300 showing DCI 1302 scheduling multiple PDSCH/PUSCH. The DCI includes a bitmap of "1101" and indicates a row of a TDRA table having $K_0/K_2=0$ and SLIV 1 of (S, L)=(1, 4); SLIV 2 of (S, L)=(1, 4); SLIV 3 of (S, L)=(1, 4). FIG. 13 shows that the first SLIV is applied to the first slot of the allocation (and based on $K_0/K_2=0$), the second SLIV is applied to the second slot of the allocation, and the third SLIV is applied to the fourth slot of the allocation based on the bitmap "1101."

Figure 14:
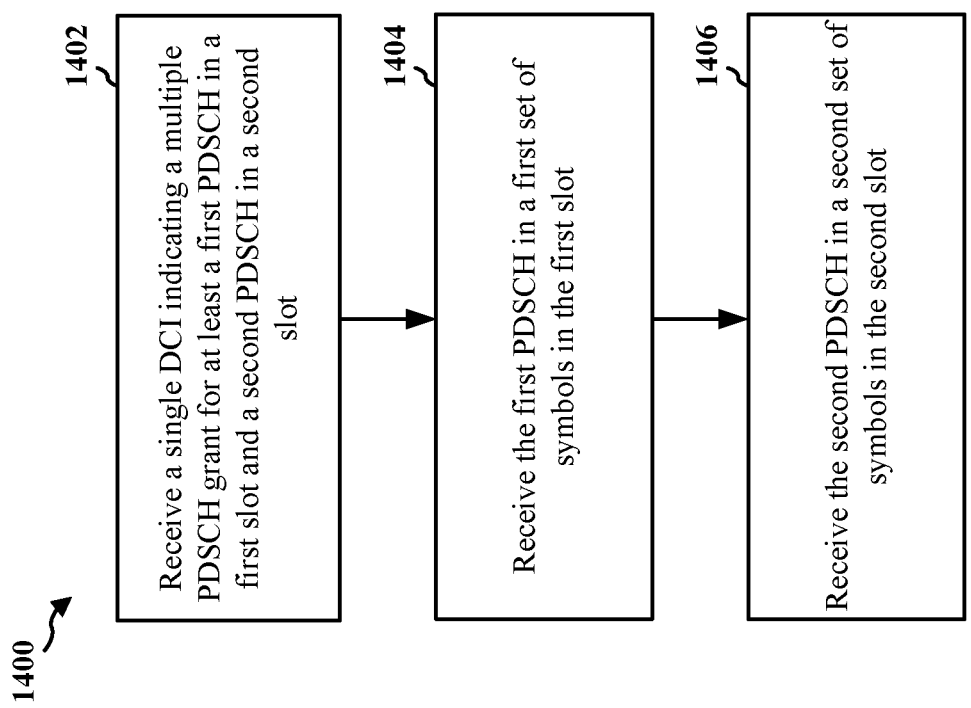
FIG. 14 is a flowchart of a method of wireless communication at a UE including reception of a single DCI scheduling non-contiguous PDSCHs.

FIG. 14 is a flowchart 1400 of a method of wireless communication. The method may be performed by a UE (e.g., the UE 104, 350, 402, 802, 1002, 1202; the apparatus 1502). The method may enable the UE to receive a single DCI scheduling PDSCH in a manner that provides time gaps having a size that allows for uplink traffic to be interleaved with downlink traffic while maintaining reduced control signaling overhead and monitoring through the single DCI.

At 1402, the UE receives, from a base station, a single downlink control information (DCI) indicating a multiple physical downlink shared channel (PDSCH) grant for at least a first PDSCH in a first slot and a second PDSCH in a second slot. The DCI may indicate the multiple PDSCH grant based on any of the aspects described in connection with FIG. 4, 6, 7, 8, 9A, 9B, 10, 11A, 11B, 12, or 13. For example, the DCI may correspond to DCI 406, 602, 702, 806, 902, 904, 1006, 1102, 1104, 1206, or 1302. The reception of the DCI may be performed, e.g., by the multi- PDSCH/PUSCH grant component 1640 of the apparatus 1602. The DCI may schedule the multiple PDSCH grant based on at least one of: a threshold combined time gap length, a threshold gap size, a threshold number of gaps, a threshold span size for the allocation including the time gaps, a threshold number of SLIVs per row of a TDRA table, a threshold span size that is based on a number of PDSCHs allocated in the multiple PDSCH grant, or a threshold on the total gap size based on the number of PDSCHs allocated in multiple PDSCH grant. As an example, a threshold for the total span size may be based on N*number of allocated PDSCHs, in which N is a positive number greater than 1, or the threshold for the total gap size may be based on M*number of allocated PDSCHs, in which M is any positive number. Example aspects of thresholds are described in connection with FIG. 20.

At 1404, the UE receives the first PDSCH in a first set of symbols in the first slot. The first PDSCH may correspond to PDSCH 1 410, 810, 1009, 1209, for example. The reception of the PDSCH may be performed, e.g., by the PDSCH component 1644 of the apparatus 1602 via the reception component 1630 and/or the RF transceiver 1622.

At 1406, the UE receives the second PDSCH in a second set of symbols in the second slot. The second PDSCH may correspond to PDSCH 2 412, 812, 1010, 1210; PDSCH 3 1011, 1211; or PDSCH 4 1012, for example, for example. The reception of the PDSCH may be performed, e.g., by the PDSCH component 1644 of the apparatus 1602 via the reception component 1630 and/or the RF transceiver 1622.

The multiple PDSCH grant may include a reference index for a time domain resource allocation (TDRA) table using a single $K_0$ value, and reception of the second PDSCH in the second slot may be based on the multiple PDSCH grant indicating a starting symbol and a length for the second PDSCH that overlaps with the first PDSCH, e.g., as described in connection with FIGS. 4 and/or 6. The second slot may be a subsequent slot to the first slot.

The multiple PDSCH grant may include a reference index for a time domain resource allocation (TDRA) table using a single $K_0$ value, and the multiple PDSCH grant may further include an indication of void resources for a third PDSCH, e.g., as described in connection with FIG. 4 and/or FIGS. 7A and 7B. The reception of the second PDSCH in the second slot may be based on the indication of the void resources for the third PDSCH. The indication of the void resources may indicate a shift of at least one slot between the first PDSCH and the second PDSCH. The shift may include a size based on a subcarrier spacing (SCS) for the first PDSCH and the second PDSCH. The UE may receive a configuration of the size of the shift relative to the SCS. The indication of the void resources may include a start and length indicator value (SLIV) of zero.

The multiple PDSCH grant may include multiple reference indexes for a time domain resource allocation (TDRA) table, and the reception of the first PDSCH in the first slot may be based on a first reference index indicating a first $K_0$ value and reception of the second PDSCH in the second slot may be based on a second reference index indicating a second $K_0$ value, e.g., as described in connection with FIG. 8, 9A, or 9B. The multiple PDSCH grant may include a number of the multiple reference indexes is equal to a number of PDSCHs scheduled by the multiple PDSCH grant, and the UE may apply each of the multiple reference indexes to a corresponding PDSCH, e.g., as described in connection with FIG. 9A. The multiple PDSCH grant may include a number of the multiple reference indexes that is less than a number of PDSCHs scheduled by the multiple PDSCH grant, and the UE may apply each of the multiple reference indexes to a corresponding group of PDSCHs, e.g., as described in connection with FIG. 9B.

The multiple PDSCH grant may include a reference index for a time domain resource allocation (TDRA) table using a single $K_0$ value and multiple delta values relative to the single $K_0$ value, e.g., as described in connection with FIG. 10, 11A, or 11B. The multiple PDSCH grant may indicate a number of the multiple delta values that is equal to a number of PDSCHs scheduled by the multiple PDSCH grant, and the UE may apply each of the multiple delta values to a corresponding PDSCH, e.g., as described in connection with FIG. 11A. The multiple PDSCH grant may indicate a number of the multiple delta values that is less than a number of PDSCHs scheduled by the multiple PDSCH grant by more than 1, and the UE may apply each of the multiple delta values to a corresponding group of PDSCHs, e.g., as described in connection with FIG. 11B.

The multiple PDSCH grant may include a reference index for a time domain resource allocation (TDRA) table using a single $K_0$ value that corresponds to multiple start and length indicator values (SLIVs), and the single DCI may further include a mapping indication that maps the multiple SLIVs to at least the first PDSCH and the second PDSCH, e.g., as described in connection with FIG. 12 and/or FIG. 13.

The UE may switch from a downlink reception to an uplink transmission during a gap in time between the first set of symbols of the first PDSCH and the second set of symbols of the second PDSCH. The UE may transmit the uplink transmission during the gap in time. The UE may switch from the uplink transmission to the downlink reception for at least one of the second PDSCH, control monitoring, or feedback.

The UE may further receive a configuration of a slot map for multiple PDSCH scheduling, e.g., prior to 1402. The single DCI, at 1402, may allocate the multiple PDSCH grant according to the slot map. The configuration of the slot map may be received in an RRC message. The UE may further receive at least one of an activation or an update of the slot map in DCI or a MAC-CE.

Figure 15:
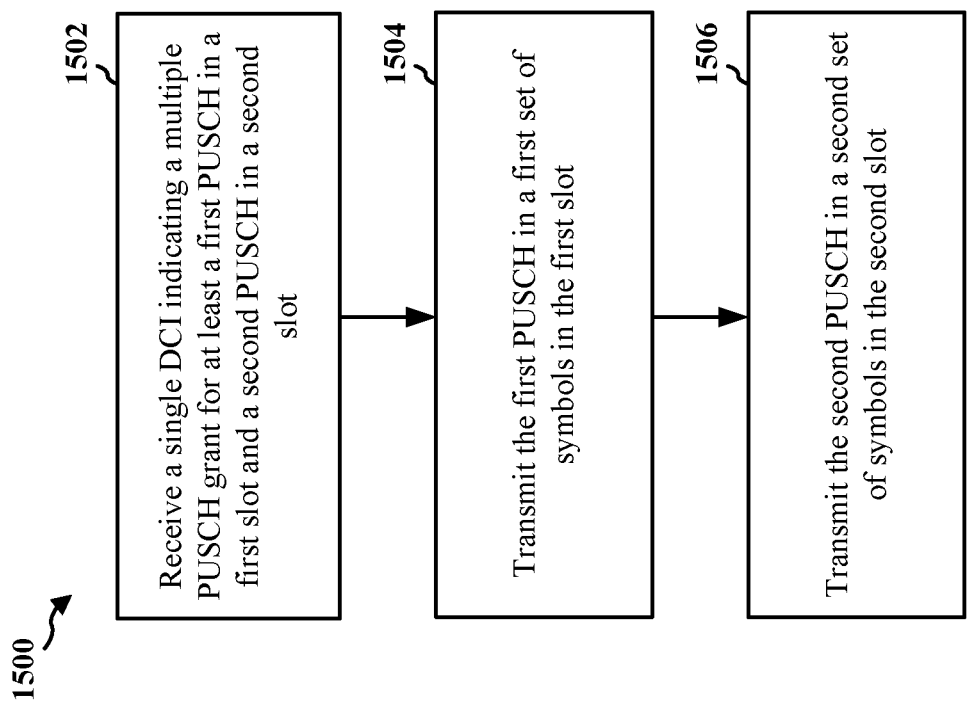
FIG. 15 is a flowchart of a method of wireless communication at a UE including reception of a single DCI scheduling non-contiguous PUSCHs.

FIG. 15 is a flowchart 1500 of a method of wireless communication. The method may be performed by a UE (e.g., the UE 104, 350, 402, 802, 1002, 1202; the apparatus 1502). The method may enable the UE to receive a single DCI scheduling PUSCH in a manner that provides time gaps having a size that allows for downlink traffic to be interleaved with uplink traffic while maintaining reduced control signaling overhead and monitoring through the single DCI.

At 1502, the UE receives from a base station, a single downlink control information (DCI) indicating a multiple physical uplink shared channel (PUSCH) grant for at least a first PUSCH in a first slot and a second PUSCH in a second slot; DCI 406, 414, 602, 702, 806, 814, 902, 904, 1006, 1014, 1102, 1104, 1206, 1214, or 1302. The DCI may indicate the multiple PDSCH grant based on any of the aspects described in connection with FIG. 4, 6, 7A, 7B, 8, 9A, 9B, 10, 11A, 11B, 12, or 13. For example, the DCI may correspond to DCI 414, 602, 702, 814, 902, 904, 1014, 1102, 1104, 1214, or 1302. The reception of the DCI may be performed, e.g., by the multi-PDSCH/PUSCH grant component 1640 of the apparatus 1602. The DCI may schedule the multiple PUSCH grant based on at least one of: a threshold combined time gap length, a threshold gap size, a threshold number of gaps, a threshold span size for the allocation including the time gaps, a threshold number of SLIVs per row of a TDRA table, a threshold span size that is based on a number of PUSCHs allocated in the multiple PUSCH grant, or a threshold on the total gap size based on the number of PUSCHs allocated in multiple PUSCH grant. As an example, a threshold for the total span size may be based on N*number of allocated PUSCHs, in which N is a positive number greater than 1, or the threshold for the total gap size may be based on M*number of allocated PUSCHs, in which M is any positive number. Example aspects of thresholds are described in connection with FIG. 20.

At 1504, the UE transmits the first PUSCH in a first set of symbols in the first slot. For example, the first PUSCH may correspond to PUSCH 1 418, 818, 1018, 1218. The transmission of the PUSCH may be performed, e.g., by the PUSCH component 1648 of the apparatus 1602 via the transmission component 1634 and/or the RF transceiver 1622.

At 1506, the UE transmits the second PUSCH in a second set of symbols in the second slot. The second PUSCH may correspond to PUSCH 2 420, 820, 1020, 1219; PUSCH 3 1220, for example. The transmission of the PUSCH may be performed, e.g., by the PUSCH component 1648 of the apparatus 1602 via the transmission component 1634 and/or the RF transceiver 1622.

The multiple PUSCH grant may include a reference index for a time domain resource allocation (TDRA) table using a single $K_2$ value, and transmission of the second PUSCH in the second slot may be based on the multiple PUSCH grant indicating a starting symbol and a length for the second PUSCH that overlaps with the first PUSCH, e.g., as described in connection with FIGS. 4 and/or 6. The second slot may be a subsequent slot to the first slot.

The multiple PUSCH grant may include a reference index for a time domain resource allocation (TDRA) table using a single $K_2$ value, and the multiple PUSCH grant further includes an indication of void resources for a third PUSCH, e.g., as described in connection with FIG. 4 and/or FIGS. 7A and 7B. The transmission of the second PUSCH in the second slot may be based on the indication of the void resources for the third PUSCH. The indication of the void resources may indicate a shift of at least one slot between the first PUSCH and the second PUSCH. The shift may include a size based on a subcarrier spacing (SCS) for the first PUSCH and the second PUSCH. The UE may receive a configuration of the size of the shift relative to the SCS. The indication of the void resources may include a start and length indicator value (SLIV) of zero.

The multiple PUSCH grant may include multiple reference indexes for a time domain resource allocation (TDRA) table, and transmission of the first PUSCH in the first slot may be based on a first reference index indicating a first $K_2$ value, e.g., as described in connection with FIG. 8, 9A, or 9B. The transmission of the second PUSCH in the second slot may be based on a second reference index indicating a second $K_2$ value. The multiple PUSCH grant may include a number of the multiple reference indexes is equal to a number of PUSCHs scheduled by the multiple PUSCH grant, and the UE may apply each of the multiple reference indexes to a corresponding PUSCH, e.g., as described in connection with FIG. 9A. The multiple PUSCH grant may include a number of the multiple reference indexes that is less than a number of PUSCHs scheduled by the multiple PUSCH grant, and the UE may apply each of the multiple reference indexes to a corresponding group of PUSCHs, e.g., as described in connection with FIG. 9B.

The multiple PUSCH grant may include a reference index for a time domain resource allocation (TDRA) table using a single $K_2$ value and multiple delta values relative to the single $K_2$ value, e.g., as described in connection with FIG. 10, 11A, or 11B. The multiple PUSCH grant may indicate a number of the multiple delta values that is equal to a number of PUSCHs scheduled by the multiple PUSCH grant, and the UE may apply each of the multiple delta values to a corresponding PUSCH, e.g., as described in connection with FIG. 11A. The multiple PUSCH grant may indicate a number of the multiple delta values that is less than a number of PUSCHs scheduled by the multiple PUSCH grant by more than 1, and the UE may apply each of the multiple delta values to a corresponding group of PUSCHs, e.g., as described in connection with FIG. 11B.

The multiple PUSCH grant may include a reference index for a time domain resource allocation (TDRA) table using a single $K_2$ value that corresponds to multiple start and length indicator values (SLIVs), and the single DCI further may include a mapping indication that maps the multiple SLIVs to at least the first PUSCH and the second PUSCH, e.g., as described in connection with FIG. 12 and/or FIG. 13.

The UE may switch from an uplink transmission to a downlink reception during a gap in time between the first set of symbols of the first PUSCH and the second set of symbols of the second PUSCH. The UE may receive the downlink transmission during the gap in time. The UE may switch from the downlink reception to the uplink transmission for the second PUSCH.

The UE may further receive a configuration of a slot map for multiple PUSCH scheduling, e.g., prior to 1502. The single DCI, at 1502, may allocate the multiple PUSCH grant according to the slot map. The configuration of the slot map may be received in an RRC message. The UE may further receive at least one of an activation or an update of the slot map in DCI or a MAC-CE.

Figure 16:
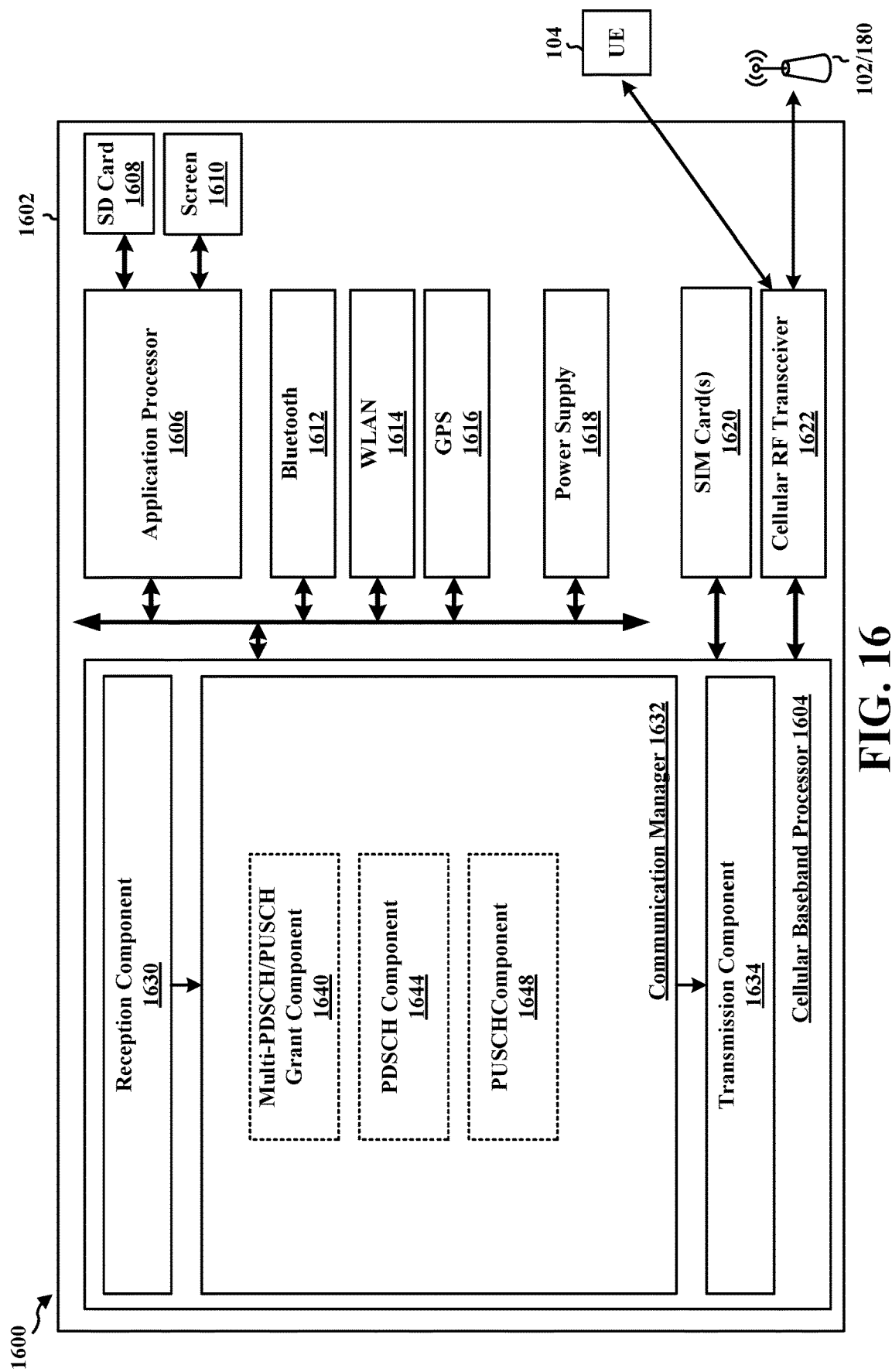
FIG. 16 is a diagram illustrating an example of a hardware implementation for an example apparatus.

FIG. 16 is a diagram 1600 illustrating an example of a hardware implementation for an apparatus 1602. The apparatus 1602 may be a UE, a component of a UE, or may implement UE functionality. In some aspects, the apparatus 1602 may include a cellular baseband processor 1604 (also referred to as a modem) coupled to a cellular RF transceiver 1622. In some aspects, the apparatus 1602 may further include one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, or a power supply 1618. The cellular baseband processor 1604 communicates through the cellular RF transceiver 1622 with the UE 104 and/or base station 102/180. The cellular baseband processor 1604 may include a computer-readable medium/memory. The computer-readable medium/memory may be non-transitory. The cellular baseband processor 1604 is responsible for general processing, including the execution of software stored on the computer-readable medium/memory. The software, when executed by the cellular baseband processor 1604, causes the cellular baseband processor 1604 to perform the various functions described supra. The computer-readable medium/memory may also be used for storing data that is manipulated by the cellular baseband processor 1604 when executing software. The cellular baseband processor 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the cellular baseband processor 1604. The cellular baseband processor 1604 may be a component of the UE 350 and may include the memory 360 and/or at least one of the TX processor 368, the RX processor 356, and the controller/processor 359. In one configuration, the apparatus 1602 may be a modem chip and include just the baseband processor 1604, and in another configuration, the apparatus 1602 may be the entire UE (e.g., see 350 of FIG. 3) and include the additional modules of the apparatus 1602.

The communication manager 1632 includes a multi-PDSCH/PUSCH grant component 1640 that is configured to receive a single DCI indicate a multiple PDSCH grant for a first PDSCH in a first slot and a second PDSCH in a second slot or a multiple PUSCH grant for at least a first PUSCH in a first slot and a second PUSCH in a second slot, e.g., as described in connection with 1402 and/or 1502. The communication manager 1632 further includes a PDSCH component 1644 that is configured to receive the first PDSCH in the first slot and receive the second PDSCH in the second slot, e.g., as described in connection with 1404 and 1406. The communication manager 1632 further includes a PUSCH component 1648 that is configured to transmit the first PUSCH in the first slot and transmit the second PUSCH in the second slot, e.g., as described in connection with 1504 and 1506.

The apparatus may include additional components that perform each of the blocks of the algorithm in the flowcharts of FIG. 14 or 15 and/or any of the aspects performed by the UE in the communication flows in FIGS. 4, 8, 10, and/or 12. As such, each block in the flowcharts of FIG. 14 or 15 and/or any of the aspects performed by the UE in the communication flows in FIGS. 4, 8, 10, and/or 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the cellular baseband processor 1604, includes means for receiving, from a base station, a single downlink control information (DCI) indicating a multiple physical downlink shared channel (PDSCH) grant for at least a first PDSCH in a first slot and a second PDSCH in a second slot. The apparatus 1602 includes means for receiving the first PDSCH in a first set of symbols in the first slot and receiving the second PDSCH in a second set of symbols in the second slot. The apparatus 1602 may further include means for receiving, from a base station, a single downlink control information (DCI) indicating a multiple physical uplink shared channel (PUSCH) grant for at least a first PUSCH in a first slot and a second PUSCH in a second slot and means for transmitting the first PUSCH in a first set of symbols in the first slot and transmitting the second PUSCH in a second set of symbols in the second slot. The apparatus 1602 may further include means for receiving a configuration of the size of the shift relative to the SCS. The apparatus 1602 may further include means for applying each of the multiple reference indexes to a corresponding PDSCH/PUSCH. The apparatus 1602 may further include means for applying each of the multiple reference indexes to a corresponding group of PDSCHs/PUSCHs. The apparatus 1602 may further include means for applying each of the multiple delta values to a corresponding PDSCH/PUSCH. The apparatus 1602 may further include means for applying each of the multiple delta values to a corresponding group of PDSCHs/PUSCHs. The apparatus 1602 may further include means for switching between downlink reception and an uplink transmission during a gap in time resources allocate for PDSCH/PUSCH. The apparatus 1602 may further include means for transmitting an uplink transmission and/or means for receiving a downlink transmission during the gap in time. The means may be one or more of the components of the apparatus 1602 configured to perform the functions recited by the means. As described supra, the apparatus 1602 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 17:
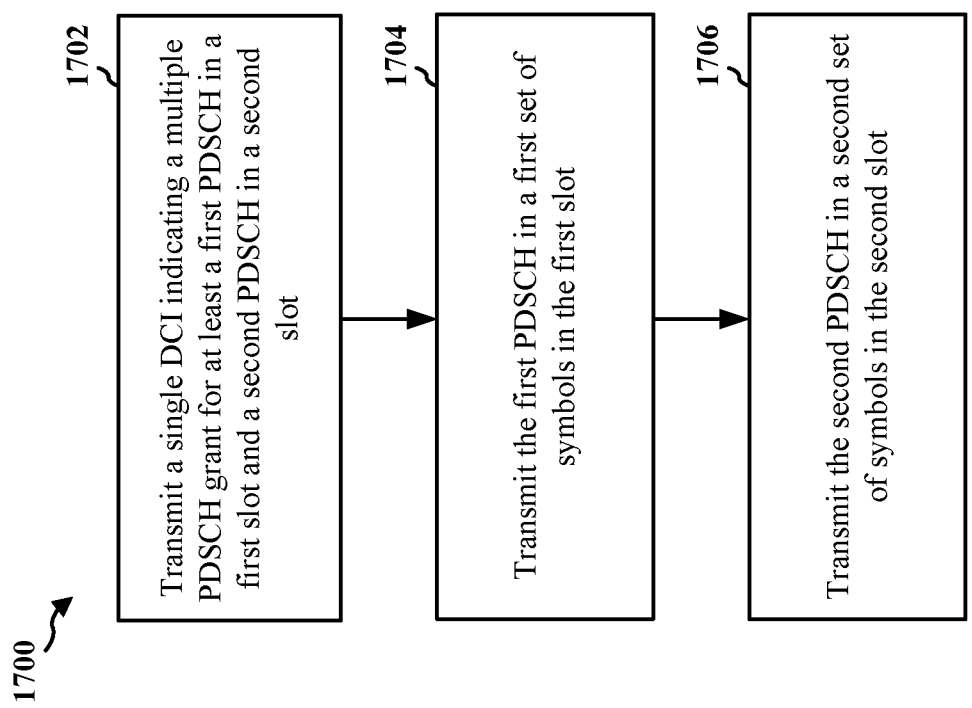
FIG. 17 is a flowchart of a method of wireless communication at a base station including transmission of a single DCI scheduling non-contiguous PDSCHs.

FIG. 17 is a flowchart 1700 of a method of wireless communication. The method may be performed by a base station or a component of a base station (e.g., the base station 102, 180, 310, 404, 804, 1004, 1204, the CU 106, the DU 105, the RU 109; the apparatus 1902) The method may be performed by a network entity or network node, which can be implemented as a base station (i.e., an aggregated base station), as a disaggregated base station, an IAB node, a relay node, a CU, a DU, a RU, a Near-RT RIC, or a Non-RT RIC in a disaggregated base station architecture, etc. The method may enable the base station to transmit a single DCI scheduling PDSCH for a UE in a manner that provides time gaps having a size that allows for uplink traffic to be interleaved with downlink traffic while maintaining reduced control signaling overhead through the single DCI.

At 1702, the network entity transmits, or outputs for transmission, a single downlink control information (DCI) for a UE indicating a multiple physical downlink shared channel (PDSCH) grant for at least a first PDSCH in a first slot and a second PDSCH in a second slot. The DCI may indicate the multiple PDSCH grant based on any of the aspects described in connection with FIG. 4, 6, 7A, 7B, 8, 9A, 9B, 10, 11A, 11B, 12, or 13. For example, the DCI may correspond to DCI 406, 602, 702, 806, 902, 904, 1006, 1102, 1104, 1206, or 1302. The transmission of the DCI may be performed, e.g., by the multi-PDSCH/PUSCH grant component 1940 of the apparatus 1902. The DCI may schedule the multiple PDSCH grant based on at least one of: a threshold combined time gap length, a threshold gap size, a threshold number of gaps, a threshold span size for the allocation including the time gaps, or a threshold number of SLIVs per row of a TDRA table, a threshold span size that is based on a number of PDSCHs allocated in the multiple PDSCH grant, or the threshold of the total gap size that is based on a number of PDSCHs allocated in the multiple PDSCH grant As an example, a threshold for the total span size may be based on N*number of allocated PDSCH, in which N is a positive number greater than 1, or the threshold for the total gap size may be based on M*number of allocated PDSCH, in which M is any positive number. Example aspects of thresholds are described in connection with FIG. 20.

At 1704, the network entity transmits, or outputs for transmission, the first PDSCH in a first set of symbols in the first slot. The first PDSCH may correspond to PDSCH 1 410, 810, 1009, 1209, for example. The transmission of the PDSCH may be performed, e.g., by the PDSCH component 1944 of the apparatus 1902 via the transmission component 1934 and/or the RF transceiver 1922.

At 1706, the network entity transmits, or outputs for transmission, the second PDSCH in a second set of symbols in the second slot. The second PDSCH may correspond to PDSCH 2 412, 812, 1010, 1210; PDSCH 3 1011, 1211; or PDSCH 4 1012, for example. The transmission of the PDSCH may be performed, e.g., by the PDSCH component 1944 of the apparatus 1902 via the transmission component 1934 and/or the RF transceiver 1922.

The multiple PDSCH grant may include a reference index for a time domain resource allocation (TDRA) table using a single $K_0$ value, and transmission of the second PDSCH in the second slot may be based on the multiple PDSCH grant indicating a starting symbol and a length for the second PDSCH that overlaps with the first PDSCH, e.g., as described in connection with FIGS. 4 and/or 6. The second slot may be a subsequent slot to the first slot.

The multiple PDSCH grant may include a reference index for a time domain resource allocation (TDRA) table using a single $K_0$ value, and the multiple PDSCH grant may further include an indication of void resources for a third PDSCH, e.g., as described in connection with FIG. 4 and/or FIGS. 7A and 7B. The transmission of the second PDSCH in the second slot is based on the indication of the void resources for the third PDSCH. The indication of the void resources may indicate a shift of at least one slot between the first PDSCH and the second PDSCH. The shift may include a size based on a subcarrier spacing (SCS) for the first PDSCH and the second PDSCH. The base station may transmit a configuration of the size of the shift relative to the SCS. The indication of the void resources may include a start and length indicator value (SLIV) of zero.

The multiple PDSCH grant may include multiple reference indexes for a time domain resource allocation (TDRA) table, and the transmission of the first PDSCH in the first slot may be based on a first reference index indicating a first $K_0$ value and transmission of the second PDSCH in the second slot may be based on a second reference index indicating a second $K_0$ value, e.g., as described in connection with FIG. 8, 9A, or 9B. The multiple PDSCH grant may include a number of the multiple reference indexes is equal to a number of PDSCHs scheduled by the multiple PDSCH grant, and the base station may apply each of the multiple reference indexes to a corresponding PDSCH, e.g., as described in connection with FIG. 9A. The multiple PDSCH grant may include a number of the multiple reference indexes that is less than a number of PDSCHs scheduled by the multiple PDSCH grant, and the base station may apply each of the multiple reference indexes to a corresponding group of PDSCHs, e.g., as described in connection with FIG. 9B.

The multiple PDSCH grant may include a reference index for a time domain resource allocation (TDRA) table using a single $K_0$ value and multiple delta values relative to the single $K_0$ value, e.g., as described in connection with FIG. 10, 11A, or 11B. The multiple PDSCH grant may indicate a number of the multiple delta values that is equal to a number of PDSCHs scheduled by the multiple PDSCH grant, and the base station may apply each of the multiple delta values to a corresponding PDSCH, e.g., as described in connection with FIG. 11A. The multiple PDSCH grant may indicate a number of the multiple delta values that is less than a number of PDSCHs scheduled by the multiple PDSCH grant by more than 1, and the base station may apply each of the multiple delta values to a corresponding group of PDSCHs, e.g., as described in connection with FIG. 11B.

The multiple PDSCH grant may include a reference index for a time domain resource allocation (TDRA) table using a single $K_0$ value that corresponds to multiple start and length indicator values (SLIVs), and the single DCI may further include a mapping indication that maps the multiple SLIVs to at least the first PDSCH and the second PDSCH, e.g., as described in connection with FIG. 12 and/or FIG. 13.

The base station may further transmit a configuration of a slot map for multiple PDSCH scheduling, e.g., prior to 1702. The single DCI, at 1702, may allocate the multiple PDSCH grant according to the slot map. The configuration of the slot map may be transmitted in an RRC message. The base station may further transmit at least one of an activation or an update of the slot map in DCI or a MAC-CE.

Figure 18:
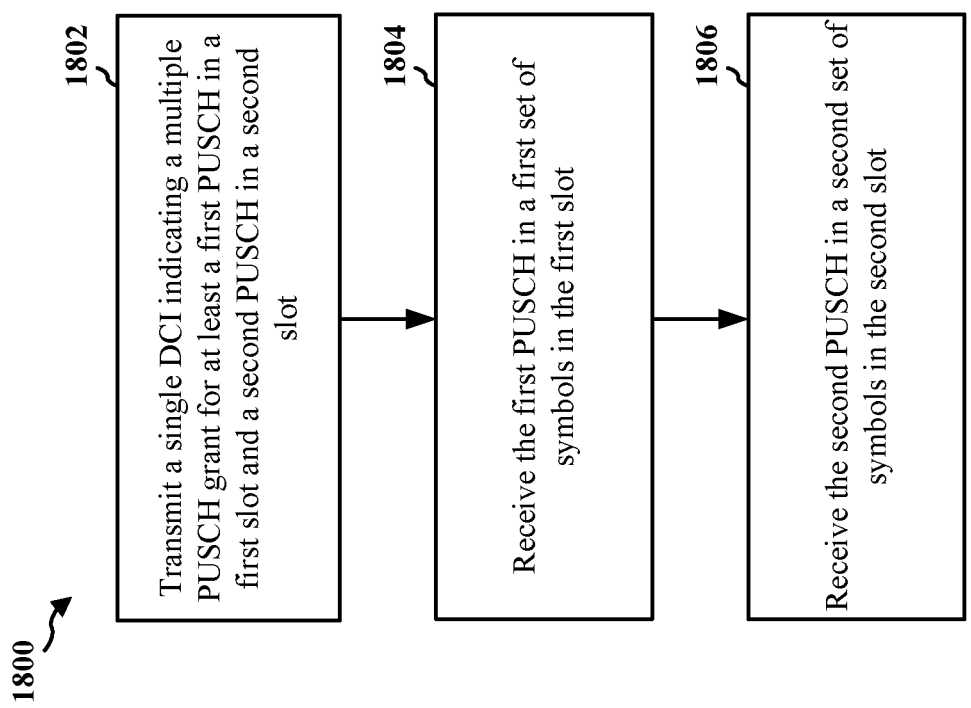
FIG. 18 is a flowchart of a method of wireless communication at a base station including transmission of a single DCI scheduling non-contiguous PUSCHs.

FIG. 18 is a flowchart 1800 of a method of wireless communication. The method may be performed by a UE base station or a component of a base station (e.g., the base station 102, 180, 310, 404, 804, 1004, 1204, the CU 106, the DU 105, the RU 109; the apparatus 1902) The method may be performed by a network entity or network node, which can be implemented as a base station (i.e., an aggregated base station), as a disaggregated base station, an IAB node, a relay node, a CU, a DU, a RU, a Near-RT RIC, or a Non-RT RIC in a disaggregated base station architecture, etc. The method may enable the base station to transmit a single DCI scheduling PUSCH in a manner that provides time gaps having a size that allows for uplink traffic to be interleaved with downlink traffic while maintaining reduced control signaling overhead and monitoring through the single DCI.

At 1802, the network entity transmits, to or outputs for transmission, a single DCI for a UE indicating a multiple PUSCH grant for at least a first PUSCH in a first slot and a second PUSCH in a second slot; DCI 406, 414, 602, 702, 806, 814, 902, 904, 1006, 1014, 1102, 1104, 1206, 1214, or 1302. The DCI may indicate the multiple PDSCH grant based on any of the aspects described in connection with FIG. 4, 6, 7A, 7B, 8, 9A, 9B, 10, 11A, 11B, 12, or 13. For example, the DCI may correspond to DCI 414, 602, 702, 814, 902, 904, 1014, 1102, 1104, 1214, or 1302. The transmission of the DCI may be performed, e.g., by the multi-PDSCH/PUSCH grant component 1940 of the apparatus 1902. The DCI may schedule the multiple PUSCH grant based on at least one of: a threshold combined time gap length, a threshold gap size, a threshold number of gaps, a threshold span size for the allocation including the time gaps, or a threshold number of SLIVs per row of a TDRA table, or a threshold span size that is based on a number of PUSCH allocated in the multiple PUSCH grant. As an example, a threshold for the total span size may be based on N*number of allocated PUSCH, in which N is a positive number greater than 1, or M*number of allocated PUSCH, in which M is any positive number. Example aspects of thresholds are described in connection with FIG. 20.

At 1804, the network entity receives, obtains, the first PUSCH in a first set of symbols in the first slot. For example, the first PUSCH may correspond to PUSCH 1 418, 818, 1018, 1218. The reception of the PUSCH may be performed, e.g., by the PUSCH component 1948 of the apparatus 1902 via the reception component 1930 and/or the RF transceiver 1922.

At 1806, the network entity receives, or obtains, the second PUSCH in a second set of symbols in the second slot. The second PUSCH may correspond to PUSCH 2 420, 820, 1020, 1219; PUSCH 3 1220, for example. The reception of the PUSCH may be performed, e.g., by the PUSCH component 1948 of the apparatus The multiple PUSCH grant may include a reference index for a time domain resource allocation (TDRA) table using a single $K_2$ value, and reception of the second PUSCH in the second slot may be based on the multiple PUSCH grant indicating a starting symbol and a length for the second PUSCH that overlaps with the first PUSCH, e.g., as described in connection with FIGS. 4 and/or 6. The second slot may be a subsequent slot to the first slot.

The multiple PUSCH grant may include a reference index for a time domain resource allocation (TDRA) table using a single $K_2$ value, and the multiple PUSCH grant may further include an indication of void resources for a third PUSCH, e.g., as described in connection with FIG. 4 and/or FIGS. 7A and 7B. The reception of the second PUSCH in the second slot may be based on the indication of the void resources for the third PUSCH. The indication of the void resources may indicate a shift of at least one slot between the first PUSCH and the second PUSCH. The shift may include a size based on a subcarrier spacing (SCS) for the first PUSCH and the second PUSCH. The base station may receive a configuration of the size of the shift relative to the SCS. The indication of the void resources may include a start and length indicator value (SLIV) of zero.

The multiple PUSCH grant may include multiple reference indexes for a time domain resource allocation (TDRA) table, and reception of the first PUSCH in the first slot may be based on a first reference index indicating a first $K_2$ value, e.g., as described in connection with FIG. 8, 9A, or 9B. The reception of the second PUSCH in the second slot may be based on a second reference index indicating a second $K_2$ value. The multiple PUSCH grant may include a number of the multiple reference indexes is equal to a number of PUSCHs scheduled by the multiple PUSCH grant, and the base station may apply each of the multiple reference indexes to a corresponding PUSCH, e.g., as described in connection with FIG. 9A. The multiple PUSCH grant may include a number of the multiple reference indexes that is less than a number of PUSCHs scheduled by the multiple PUSCH grant, and the base station may apply each of the multiple reference indexes to a corresponding group of PUSCHs, e.g., as described in connection with FIG. 9B.

The multiple PUSCH grant may include a reference index for a time domain resource allocation (TDRA) table using a single $K_2$ value and multiple delta values relative to the single $K_2$ value, e.g., as described in connection with FIG. 10, 11A, or 11B. The multiple PUSCH grant may indicate a number of the multiple delta values that is equal to a number of PUSCHs scheduled by the multiple PUSCH grant, and the base station may apply each of the multiple delta values to a corresponding PUSCH, e.g., as described in connection with FIG. 11A. The multiple PUSCH grant may indicate a number of the multiple delta values that is less than a number of PUSCHs scheduled by the multiple PUSCH grant by more than 1, and the base station may apply each of the multiple delta values to a corresponding group of PUSCHs, e.g., as described in connection with FIG. 11B.

The multiple PUSCH grant may include a reference index for a time domain resource allocation (TDRA) table using a single $K_2$ value that corresponds to multiple start and length indicator values (SLIVs), and the single DCI further may include a mapping indication that maps the multiple SLIVs to at least the first PUSCH and the second PUSCH, e.g., as described in connection with FIG. 12 and/or FIG. 13.

The base station may further transmit a configuration of a slot map for multiple PUSCH scheduling, e.g., prior to 1802. The single DCI, at 1802, may allocate the multiple PUSCH grant according to the slot map. The configuration of the slot map may be transmitted in an RRC message. The base station may further transmit at least one of an activation or an update of the slot map in DCI or a MAC-CE.

Figure 19:
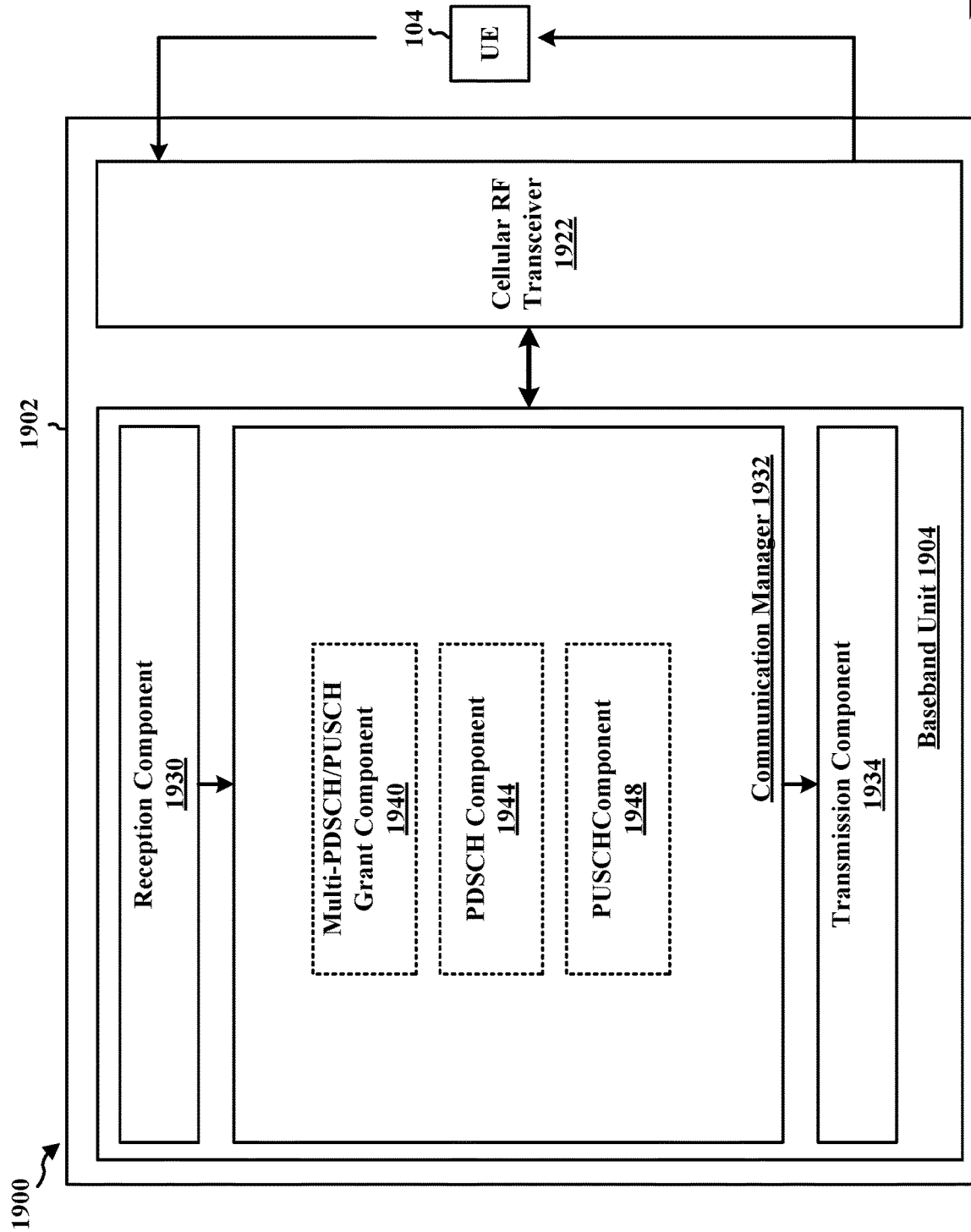
FIG. 19 is a diagram illustrating an example of a hardware implementation for an example apparatus.

FIG. 19 is a diagram 1900 illustrating an example of a hardware implementation for an apparatus 1902. The apparatus 1902 may be a base station, a component of a base station, or may implement base station functionality. The apparatus may correspond to a network entity or network node, which can be implemented as a base station (i.e., an aggregated base station), as a disaggregated base station, an IAB node, a relay node, a CU, a DU, a RU, a Near-RT RIC, or a Non-RT RIC in a disaggregated base station architecture, etc. In some aspects, the apparatus 1502 may include a baseband unit 1904. The baseband unit 1904 may communicate through a cellular RF transceiver 1922 with the UE 104. The baseband unit 1904 may include a computer-readable medium/memory. The baseband unit 1904 is responsible for general processing, including the execution of software stored on the computer-readable medium/memory. The software, when executed by the baseband unit 1904, causes the baseband unit 1904 to perform the various functions described supra. The computer-readable medium/memory may also be used for storing data that is manipulated by the baseband unit 1904 when executing software. The baseband unit 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the baseband unit 1904. The baseband unit 1904 may be a component of the base station 310 and may include the memory 376 and/or at least one of the TX processor 316, the RX processor 370, and the controller/processor 375.

The communication manager 1932 includes a multi-PDSCH/PUSCH grant component 1940 that is configured to transmit a single DCI indicate a multiple PDSCH grant for a first PDSCH in a first slot and a second PDSCH in a second slot or a multiple PUSCH grant for at least a first PUSCH in a first slot and a second PUSCH in a second slot, e.g., as described in connection with 1702 and/or 1802. The communication manager 1932 further includes a PDSCH component 1944 that is configured to transmit the first PDSCH in the first slot and transmit the second PDSCH in the second slot, e.g., as described in connection with 1704 and 1706. The communication manager 1932 further includes a PUSCH component 1948 that is configured to receive the first PUSCH in the first slot and receive the second PUSCH in the second slot, e.g., as described in connection with 1804 and 1806.

The apparatus may include additional components that perform each of the blocks of the algorithm in the flowcharts of FIG. 17 or 18 and/or any of the aspects performed by the base station in the communication flows in FIGS. 4, 8, 10, and/or 12. As such, each block in the flowcharts of FIG. 17 or 18 and/or any of the aspects performed by the base station in the communication flows in FIGS. 4, 8, 10, and/or 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1902 may include a variety of components configured for various functions. In one configuration, the apparatus 1902, and in particular the baseband unit 1904, includes means for means for transmitting, to a UE, a single downlink control information (DCI) indicating a multiple physical downlink shared channel (PDSCH) grant for at least a first PDSCH in a first slot and a second PDSCH in a second slot. The apparatus 1902 includes means for transmitting the first PDSCH in a first set of symbols in the first slot and transmitting the second PDSCH in a second set of symbols in the second slot. The apparatus 1902 may further include means for transmitting, to a UE, a single downlink control information (DCI) indicating a multiple physical uplink shared channel (PUSCH) grant for at least a first PUSCH in a first slot and a second PUSCH in a second slot and means for receiving the first PUSCH in a first set of symbols in the first slot and receiving the second PUSCH in a second set of symbols in the second slot. The apparatus 1902 may further include means for transmitting a configuration of the size of the shift relative to the SCS. The apparatus 1902 may further include means for applying each of the multiple reference indexes to a corresponding PDSCH/PUSCH. The apparatus 1902 may further include means for applying each of the multiple reference indexes to a corresponding group of PDSCHs/PUSCHs. The apparatus 1902 may further include means for applying each of the multiple delta values to a corresponding PDSCH/PUSCH. The apparatus 1902 may further include means for applying each of the multiple delta values to a corresponding group of PDSCHs/PUSCHs. The means may be one or more of the components of the apparatus 1902 configured to perform the functions recited by the means. As described supra, the apparatus 1902 may include the TX Processor 316, the RX Processor 370, and the controller/processor 375. As such, in one configuration, the means may be the TX Processor 316, the RX Processor 370, and the controller/processor 375 configured to perform the functions recited by the means.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 21:
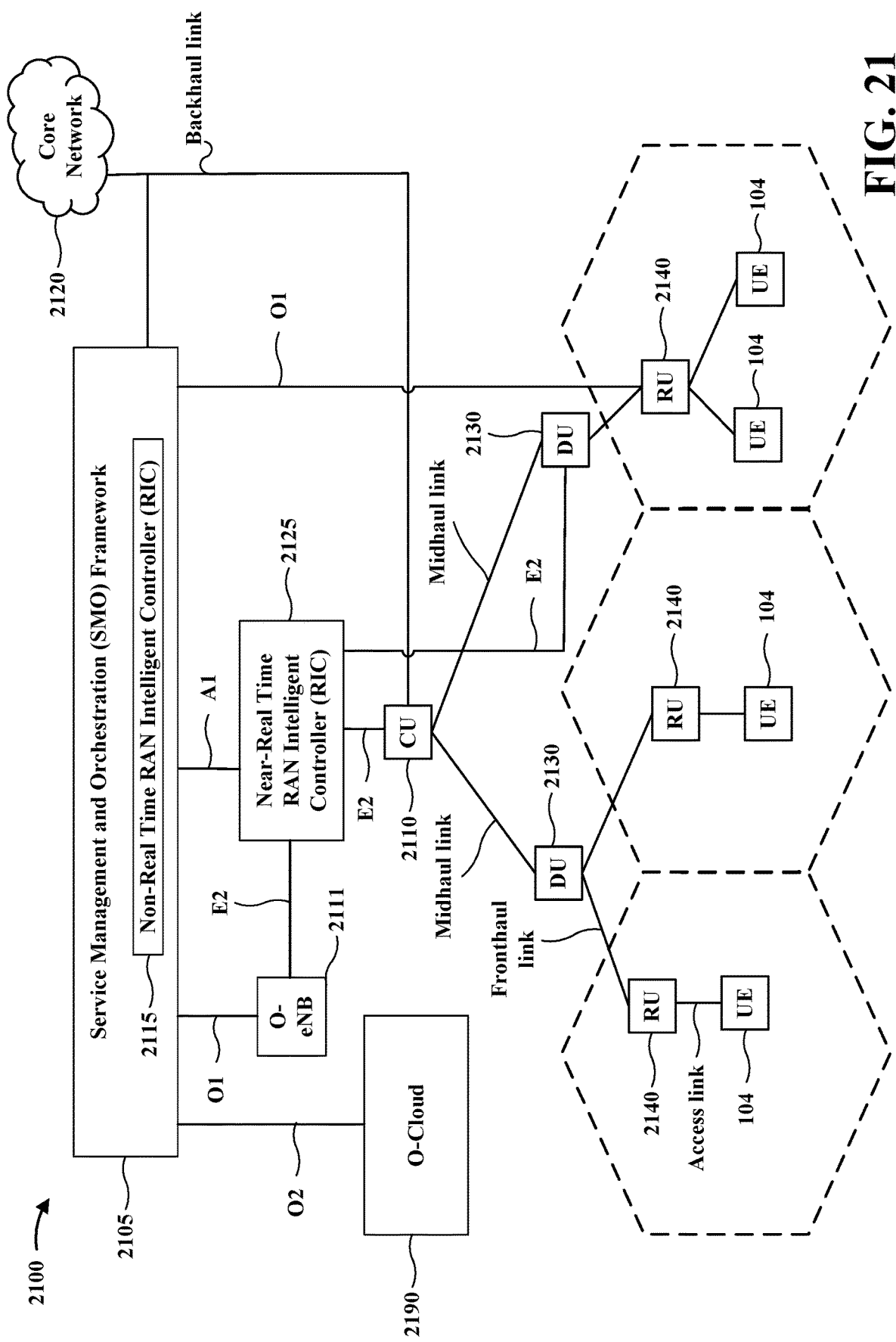
FIG. 21 is a diagram illustrating an example disaggregated base station architecture.

FIG. 21 shows a diagram illustrating an example disaggregated base station 2100 architecture. The disaggregated base station 2100 architecture may include one or more central units (CUs) 2110 that can communicate directly with a core network 2120 via a backhaul link, or indirectly with the core network 2120 through one or more disaggregated base station units (such as a Near-Real Time (Near-RT) RAN Intelligent Controller (RIC) 2125 via an E2 link, or a Non-Real Time (Non-RT) RIC 2115 associated with a Service Management and Orchestration (SMO) Framework 2105, or both). A CU 2110 may communicate with one or more distributed units (DUs) 2130 via respective midhaul links, such as an F1 interface. The DUs 2130 may communicate with one or more radio units (RUs) 2140 via respective fronthaul links. The RUs 2140 may communicate with respective UEs 104 via one or more radio frequency (RF) access links. In some implementations, the UE 104 may be simultaneously served by multiple RUs 2140.

Each of the units, i.e., the CUs 2110, the DUs 2130, the RUs 2140, as well as the Near-RT RICs 2125, the Non-RT RICs 2115 and the SMO Framework 2105, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 2110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 2110. The CU 2110 may be configured to handle user plane functionality (i.e., Central Unit-User Plane (CU-UP)), control plane functionality (i.e., Central Unit-Control Plane (CU-CP)), or a combination thereof. In some implementations, the CU 2110 can be logically split into one or more CU-UP units and one or more CU-CP units. The CU-UP unit can communicate bidirectionally with the CU-CP unit via an interface, such as the E1 interface when implemented in an O-RAN configuration. The CU 2110 can be implemented to communicate with the DU 2130, as necessary, for network control and signaling.

The DU 2130 may correspond to a logical unit that includes one or more base station functions to control the operation of one or more RUs 2140. In some aspects, the DU 2130 may host one or more of a radio link control (RLC)

layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 2130 may further host one or more low PHY layers. Each layer (or module) can be implemented with an interface configured to communicate signals with other layers (and modules) hosted by the DU 2130, or with the control functions hosted by the CU 2110.

Lower-layer functionality can be implemented by one or more RUs 2140. In some deployments, an RU 2140, controlled by a DU 2130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 2140 can be implemented to handle over the air (OTA) communication with one or more UEs 104. In some implementations, real-time and non-real-time aspects of control and user plane communication with the RU(s) 2140 can be controlled by the corresponding DU 2130. In some scenarios, this configuration can enable the DU(s) 2130 and the CU 2110 to be implemented in a cloud-based RAN architecture, such as a vRAN architecture.

The SMO Framework 2105 may be configured to support RAN deployment and provisioning of non-virtualized and virtualized network elements. For non-virtualized network elements, the SMO Framework 2105 may be configured to support the deployment of dedicated physical resources for RAN coverage requirements which may be managed via an operations and maintenance interface (such as an O1 interface). For virtualized network elements, the SMO Framework 2105 may be configured to interact with a cloud computing platform (such as an open cloud (O-Cloud) 2190) to perform network element life cycle management (such as to instantiate virtualized network elements) via a cloud computing platform interface (such as an O2 interface). Such virtualized network elements can include, but are not limited to, CUs 2110, DUs 2130, RUs 2140 and Near-RT RICs 2125. In some implementations, the SMO Framework 2105 can communicate with a hardware aspect of a 4G RAN, such as an open eNB (O-eNB) 2111, via an O1 interface. Additionally, in some implementations, the SMO Framework 2105 can communicate directly with one or more RUs 2140 via an O1 interface. The SMO Framework 2105 also may include a Non-RT RIC 2115 configured to support functionality of the SMO Framework 2105.

The Non-RT RIC 2115 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 2125. The Non-RT RIC 2115 may be coupled to or communicate with (such as via an A1 interface) the Near-RT RIC 2125. The Near-RT RIC 2125 may be configured to include a logical function that enables near-real-time control and optimization of RAN elements and resources via data collection and actions over an interface (such as via an E2 interface) connecting one or more CUs 2110, one or more DUs 2130, or both, as well as an O-eNB, with the Near-RT RIC 2125.

In some implementations, to generate AI/ML models to be deployed in the Near-RT RIC 2125, the Non-RT RIC 2115 may receive parameters or external enrichment information from external servers. Such information may be utilized by the Near-RT RIC 2125 and may be received at the SMO Framework 2105 or the Non-RT RIC 2115 from non-network data sources or from network functions. In some examples, the Non-RT RIC 2115 or the Near-RT RIC 2125 may be configured to tune RAN behavior or performance. For example, the Non-RT RIC 2115 may monitor long-term trends and patterns for performance and employ AI/ML models to perform corrective actions through the SMO Framework 2105 (such as reconfiguration via O1) or via creation of RAN management policies (such as A1 policies).

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, comprising: receiving, from a base station, a single DCI indicating a multiple PDSCH grant for at least a first PDSCH in a first slot and a second PDSCH in a second slot; receiving the first PDSCH in a first set of symbols in the first slot; and receiving the second PDSCH in a second set of symbols in the second slot.

In aspect, 2, the method of aspect 1 further includes that the multiple PDSCH grant includes a reference index for a TDRA table using a single $K_0$ value, and reception of the second PDSCH in the second slot is based on the multiple PDSCH grant indicating a starting symbol and a length for the second PDSCH that overlaps with the first PDSCH.

In aspect 3, the method of aspect 2 further includes that the second slot is a subsequent slot to the first slot.

In aspect 4, the method of any of aspects 1-2 further includes that the multiple PDSCH grant includes a reference index for a TDRA table using a single $K_0$ value, and the multiple PDSCH grant further comprises an indication of void resources for a third PDSCH, and wherein reception of the second PDSCH in the second slot is based on the indication of the void resources for the third PDSCH.

In aspect 5, the method of aspect 4 further includes that the indication of the void resources indicates a shift of at least one slot between the first PDSCH and the second PDSCH.

In aspect 6, the method of aspect 4 or aspect 5 further includes that the shift comprises a size based on an SCS for the first PDSCH and the second PDSCH.

In aspect 7, the method of aspect 6 further includes receiving a configuration of the size of the shift relative to the SCS.

In aspect 8, the method of any of aspects 4-7 further includes that the indication of the void resources comprises a SLIV of zero.

In aspect 9, the method of aspect 1 further includes that the multiple PDSCH grant includes multiple reference indexes for a TDRA table, and wherein a first reception of the first PDSCH in the first slot is based on a first reference index indicating a first $K_0$ value and a second reception of the second PDSCH in the second slot is based on a second reference index indicating a second $K_0$ value.

In aspect 10, the method of aspect 9 further includes that the multiple PDSCH grant includes a number of the multiple reference indexes is equal to a number of PDSCHs scheduled by the multiple PDSCH grant, the method further comprising: applying each of the multiple reference indexes to a corresponding PDSCH.

In aspect 11, the method of aspect 9 further includes that the multiple PDSCH grant includes a number of the multiple reference indexes that is less than a number of PDSCHs scheduled by the multiple PDSCH grant, the method further comprising: applying each of the multiple reference indexes to a corresponding group of PDSCHs.

In aspect 12, the method of aspect 1 further includes that the multiple PDSCH grant includes a reference index for a TDRA table using a single $K_0$ value and multiple delta values relative to the single $K_0$ value.

In aspect 13, the method of aspect 12 further includes that the multiple PDSCH grant indicates a number of the multiple delta values that is equal to a number of PDSCHs scheduled by the multiple PDSCH grant, the method further comprising: applying each of the multiple delta values to a corresponding PDSCH.

In aspect 14, the method of aspect 12 further includes that the multiple PDSCH grant indicates a number of the multiple delta values that is less than a number of PDSCHs scheduled by the multiple PDSCH grant by more than 1, the method further comprising: applying each of the multiple delta values to a corresponding group of PDSCHs.

In aspect 15, the method of aspect 1 further includes that the multiple PDSCH grant includes a reference index for a TDRA table using a single $K_0$ value that corresponds to multiple SLIVs, and the single DCI further includes a mapping indication that maps the multiple SLIVs to at least the first PDSCH and the second PDSCH.

In aspect 16, the method of any of aspects 1-15 further includes switching from a downlink reception to an uplink transmission during a gap in time between the first set of symbols of the first PDSCH and the second set of symbols of the second PDSCH; transmitting the uplink transmission during the gap in time; and switching from the uplink transmission to the downlink reception for at least one of the second PDSCH, control monitoring, or feedback.

In aspect 17, the method of any of aspects 1-16 further includes that the DCI schedules the multiple PDSCH grant based on at least one of: a threshold combined time gap length, a threshold gap size, a threshold number of gaps, a first threshold span size for the allocation including one or more time gaps, a threshold number of SLIVs per row of a TDRA table, or a second threshold span size that is based on a number of PDSCH allocated in the multiple PDSCH grant.

In aspect 18, the method of any of aspects 1-17 further includes receiving a configuration of a slot map for multiple PDSCH scheduling, wherein the single DCI allocates the multiple PDSCH grant according to the slot map.

In aspect 19, the method of aspect 18 further includes that the configuration of the slot map is received in an RRC message.

In aspect 20, the method of aspect 19 further includes receiving at least one of an activation or an update of the slot map in an additional DCI or a MAC-CE.

Aspect 21 is a method of wireless communication at a UE, comprising: receiving, from a base station, a single DCI indicating a multiple PUSCH grant for at least a first PUSCH in a first slot and a second PUSCH in a second slot; transmitting the first PUSCH in a first set of symbols in the first slot; and transmitting the second PUSCH in a second set of symbols in the second slot.

In aspect 22, the method of aspect 21 further includes that the multiple PUSCH grant includes a reference index for a TDRA table using a single $K_2$ value, and transmission of the second PUSCH in the second slot is based on the multiple PUSCH grant indicating a starting symbol and a length for the second PUSCH that overlaps with the first PUSCH.

In aspect 23, the method of aspect 22 further includes that the second slot is a subsequent slot to the first slot.

In aspect 24, the method of aspect 21 further includes that the multiple PUSCH grant includes a reference index for a TDRA table using a single $K_2$ value, and the multiple PUSCH grant further comprises an indication of void resources for a third PUSCH, and wherein transmission of the second PUSCH in the second slot is based on the indication of the void resources for the third PUSCH.

In aspect 25, the method of aspect 24 further includes that the indication of the void resources indicates a shift of at least one slot between the first PUSCH and the second PUSCH.

In aspect 26, the method of aspect 24 or 25 further includes that the shift comprises a size based on an SCS for the first PUSCH and the second PUSCH.

In aspect 27, the method of any of aspects 24-26 further includes receiving a configuration of the size of the shift relative to the SCS.

In aspect 28, the method of any of aspects 24-27 further includes that the indication of the void resources comprises a SLIV of zero.

In aspect 29, the method of aspect 21 further includes that the multiple PUSCH grant includes multiple reference indexes for a TDRA table, and wherein a first transmission of the first PUSCH in the first slot is based on a first reference index indicating a first $K_2$ value and a second transmission of the second PUSCH in the second slot is based on a second reference index indicating a second $K_2$ value.

In aspect 30, the method of aspect 29 further includes that the multiple PUSCH grant includes a number of the multiple reference indexes is equal to a number of PUSCHs scheduled by the multiple PUSCH grant, the method further comprising: applying each of the multiple reference indexes to a corresponding PUSCH.

In aspect 31, the method of aspect 29 further includes that the multiple PUSCH grant includes a number of the multiple reference indexes that is less than a number of PUSCHs scheduled by the multiple PUSCH grant, the method further comprising: applying each of the multiple reference indexes to a corresponding group of PUSCHs.

In aspect 32, the method of aspect 21 further includes that the multiple PUSCH grant includes a reference index for a TDRA table using a single $K_2$ value and multiple delta values relative to the single $K_2$ value.

In aspect 33, the method of aspect 32 further includes that the multiple PUSCH grant indicates a number of the multiple delta values that is equal to a number of PUSCHs scheduled by the multiple PUSCH grant, the method further comprising: applying each of the multiple delta values to a corresponding PUSCH.

In aspect 34, the method of aspect 32 further includes that the multiple PUSCH grant indicates a number of the multiple delta values that is less than a number of PUSCHs scheduled by the multiple PUSCH grant by more than 1, the method further comprising: applying each of the multiple delta values to a corresponding group of PUSCHs.

In aspect 35, the method of aspect 21 further includes that the multiple PUSCH grant includes a reference index for a TDRA table using a single $K_2$ value that corresponds to multiple SLIVs, and the single DCI further includes a mapping indication that maps the multiple SLIVs to at least the first PUSCH and the second PUSCH.

In aspect 36, the method of any of aspects 21-34 further includes that switching from an uplink transmission to a downlink reception during a gap in time between the first set of symbols of the first PUSCH and the second set of symbols of the second PUSCH; receiving a downlink transmission during the gap in time; and switching from the downlink reception to the uplink transmission for the second PUSCH.

In aspect 37, the method of any of aspects 21-36 further includes that the DCI schedules the multiple PUSCH grant based on at least one of: a threshold combined time gap length, a threshold gap size, a threshold number of gaps, a first threshold span size for the allocation including one or more time gaps, a second threshold number of SLIVs per row of a TDRA table, or a threshold span size that is based on a number of PUSCH allocated in the multiple PUSCH grant.

In aspect 38, the method of any of aspects 21-37 further includes receiving a configuration of a slot map for multiple PUSCH scheduling, wherein the single DCI allocates the multiple PUSCH grant according to the slot map.

In aspect 39, the method of aspect 38 further includes that the configuration of the slot map is received in an RRC message.

In aspect 40, the method of aspect 39 further includes receiving at least one of an activation or an update of the slot map in an additional DCI or a MAC-CE.

Aspect 41 is a method of wireless communication at a network entity, comprising: outputting for transmission a single DCI for a UE indicating a multiple PDSCH grant for at least a first PDSCH in a first slot and a second PDSCH in a second slot; outputting for transmission the first PDSCH in a first set of symbols in the first slot; and outputting for transmission the second PDSCH in a second set of symbols in the second slot.

In aspect 42, the method of aspect 41 further includes that the multiple PDSCH grant includes a reference index for a TDRA table using a single $K_0$ value, and transmission of the second PDSCH in the second slot is based on the multiple PDSCH grant indicating a starting symbol and a length for the second PDSCH that overlaps with the first PDSCH.

In aspect 43, the method of aspect 42 further includes that the second slot is a subsequent slot to the first slot.

In aspect 44, the method of aspect 41 further includes that the multiple PDSCH grant includes a reference index for a TDRA table using a single $K_0$ value, and the multiple PDSCH grant further comprises an indication of void resources for a third PDSCH, and wherein transmission of the second PDSCH in the second slot is based on the indication of the void resources for the third PDSCH.

In aspect 45, the method of aspect 44 further includes that the indication of the void resources indicates a shift of at least one slot between the first PDSCH and the second PDSCH.

In aspect 46, the method of aspect 45 further includes that the shift comprises a size based on an SCS for the first PDSCH and the second PDSCH.

In aspect 47, the method of aspect 46 further includes outputting for transmission a configuration of the size of the shift relative to the SCS.

In aspect 48, the method of any of aspects 42-47 further includes that the indication of the void resources comprises a SLIV of zero.

In aspect 49, the method of aspect 41 further includes that the multiple PDSCH grant includes multiple reference indexes for a TDRA table, and wherein a first transmission of the first PDSCH in the first slot is based on a first reference index indicating a first $K_0$ value and a second transmission of the second PDSCH in the second slot is based on a second reference index indicating a second $K_0$ value.

In aspect 50, the method of aspect 49 further includes that the multiple PDSCH grant includes a number of the multiple reference indexes is equal to a number of PDSCHs scheduled by the multiple PDSCH grant, the method further comprising: applying each of the multiple reference indexes to a corresponding PDSCH.

In aspect 51, the method of aspect 49 further includes that the multiple PDSCH grant includes a number of the multiple reference indexes that is less than a number of PDSCHs scheduled by the multiple PDSCH grant, the method further comprising: applying each of the multiple reference indexes to a corresponding group of PDSCHs.

In aspect 52, the method of aspect 41 further includes that the multiple PDSCH grant includes a reference index for a TDRA table using a single $K_0$ value and multiple delta values relative to the single $K_0$ value.

In aspect 53, the method of aspect 52 further includes that the multiple PDSCH grant indicates a number of the multiple delta values that is equal to a number of PDSCHs scheduled by the multiple PDSCH grant, the method further comprising: applying each of the multiple delta values to a corresponding PDSCH.

In aspect 54, the method of aspect 53 further includes that the multiple PDSCH grant indicates a number of the multiple delta values that is less than a number of PDSCHs scheduled by the multiple PDSCH grant by more than 1, the method further comprising: applying each of the multiple delta values to a corresponding group of PDSCHs.

In aspect 55, the method of aspect 41 further includes that the multiple PDSCH grant includes a reference index for a TDRA table using a single $K_0$ value that corresponds to multiple SLIVs, and the single DCI further includes a mapping indication that maps the multiple SLIVs to at least the first PDSCH and the second PDSCH.

In aspect 56, the method of any of aspects 41-55 further includes that the DCI schedules the multiple PDSCH grant based on at least one of: a threshold combined time gap length, a threshold gap size, a threshold number of gaps, a first threshold span size for the allocation including one or more time gaps, a threshold number of SLIVs per row of a TDRA table, or a second threshold span size that is based on a number of PDSCH allocated in the multiple PDSCH grant.

In aspect 57, the method of any of aspects 41-56 further includes outputting for transmission a configuration of a slot map for multiple PDSCH scheduling, wherein the single DCI allocates the multiple PDSCH grant according to the slot map.

In aspect 58, the method of aspect 57 further includes that the configuration of the slot map is d in an RRC message.

In aspect 59, the method of aspect 58 further includes outputting for transmission at least one of an activation or an update of the slot map in an additional DCI or a MAC-CE.

Aspect 60 is a method of wireless communication at a network entity, comprising: outputting for transmission a single DCI for a UE indicating a multiple PUSCH grant for at least a first PUSCH in a first slot and a second PUSCH in a second slot; obtaining the first PUSCH in a first set of symbols in the first slot; and obtaining the second PUSCH in a second set of symbols in the second slot.

In aspect 61, the method of aspect 60 further includes that the multiple PUSCH grant includes a reference index for a TDRA table using a single $K_2$ value, and reception of the second PUSCH in the second slot is based on the multiple PUSCH grant indicating a starting symbol and a length for the second PUSCH that overlaps with the first PUSCH.

In aspect 62, the method of aspect 61 further includes that the second slot is a subsequent slot to the first slot.

In aspect 63, the method of aspect 60 further includes that the multiple PUSCH grant includes a reference index for a TDRA table using a single $K_2$ value, and the multiple PUSCH grant further comprises an indication of void resources for a third PUSCH, and wherein reception of the second PUSCH in the second slot is based on the indication of the void resources for the third PUSCH.

In aspect 64, the method of aspect 63 further includes that the indication of the void resources indicates a shift of at least one slot between the first PUSCH and the second PUSCH.

In aspect 65, the method of aspect 64 further includes that the shift comprises a size based on an SCS for the first PUSCH and the second PUSCH.

In aspect 66, the method of aspect 65 further includes outputting for transmission a configuration of the size of the shift relative to the SCS.

In aspect 67, the method of any of aspects 63-66 further includes that the indication of the void resources comprises a SLIV of zero.

In aspect 68, the method of aspect 60 further includes that the multiple PUSCH grant includes multiple reference indexes for a TDRA table, and wherein a first reception of the first PUSCH in the first slot is based on a first reference index indicating a first $K_2$ value and a second reception of the second PUSCH in the second slot is based on a second reference index indicating a second $K_2$ value.

In aspect 69, the method of aspect 68 further includes that the multiple PUSCH grant includes a number of the multiple reference indexes is equal to a number of PUSCHs scheduled by the multiple PUSCH grant, the method further comprising: applying each of the multiple reference indexes to a corresponding PUSCH.

In aspect 70, the method of aspect 68 further includes that the multiple PUSCH grant includes a number of the multiple reference indexes that is less than a number of PUSCHs scheduled by the multiple PUSCH grant, the method further comprising: applying each of the multiple reference indexes to a corresponding group of PUSCHs.

In aspect 71, the method of aspect 60 further includes that the multiple PUSCH grant includes a reference index for a TDRA table using a single $K_2$ value and multiple delta values relative to the single $K_2$ value.

In aspect 72, the method of aspect 71 further includes that the multiple PUSCH grant indicates a number of the multiple delta values that is equal to a number of PUSCHs scheduled by the multiple PUSCH grant, the method further comprising: applying each of the multiple delta values to a corresponding PUSCH.

In aspect 73, the method of aspect 71 further includes that the multiple PUSCH grant indicates a number of the multiple delta values that is less than a number of PUSCHs scheduled by the multiple PUSCH grant by more than 1, the method further comprising: applying each of the multiple delta values to a corresponding group of PUSCHs.

In aspect 74, the method of aspect 60 further includes that the multiple PUSCH grant includes a reference index for a TDRA table using a single $K_2$ value that corresponds to multiple SLIVs, and the single DCI further includes a mapping indication that maps the multiple SLIVs to at least the first PUSCH and the second PUSCH.

In aspect 75, the method of any of aspects 60-74 further includes that the DCI schedules the multiple PUSCH grant based on at least one of: a threshold combined time gap length, a threshold gap size, a threshold number of gaps, a first threshold span size for the allocation including one or more time gaps, a threshold number of SLIVs per row of a TDRA table, or a second threshold span size that is based on a number of PUSCH allocated in the multiple PUSCH grant.

In aspect 76, the method of any of aspects 60-75 further includes outputting for transmission a configuration of a slot map for multiple PUSCH scheduling, wherein the single DCI allocates the multiple PUSCH grant according to the slot map.

In aspect 77, the method of aspect 76 further includes that the configuration of the slot map is in an RRC message.

In aspect 78, the method of aspect 77 further includes outputting for transmission at least one of an activation or an update of the slot map in an additional DCI or a MAC-CE.

Aspect 79 is an apparatus for wireless communication at a UE, comprising: at least one processor and at least one memory communicatively coupled with the at least one processor and storing processor-readable code that, when executed by the at least one processor, is configured to cause the UE to perform the method of any of aspects 1-20.

In aspect 80, the apparatus of aspect 79 further includes a transceiver coupled to the at least one processor.

Aspect 81 is an apparatus for wireless communication at a UE, comprising means to perform the method of any of aspects 1-20.

In aspect 82, the apparatus of aspect 81 further includes a transceiver.

Aspect 83 is a non-transitory computer-readable medium storing computer executable code at a UE, the code when executed by a processor causes the processor to perform the method of any of aspects 1-20.

Aspect 84 is an apparatus for wireless communication at a UE, comprising: at least one processor and at least one memory communicatively coupled with the at least one processor and storing processor-readable code that, when executed by the at least one processor, is configured to cause the UE to perform the method of any of aspects 21-40.

In aspect 85, the apparatus of aspect 84 further includes a transceiver coupled to the at least one processor.

Aspect 86 is an apparatus for wireless communication at a UE, comprising means to perform the method of any of aspects 21-40.

In aspect 87, the apparatus of aspect 86 further includes a transceiver.

Aspect 88 is a non-transitory computer-readable medium storing computer executable code at a UE, the code when executed by a processor causes the processor to perform the method of any of aspects 21-40.

Aspect 89 is an apparatus for wireless communication at a network entity, comprising: at least one processor and at least one memory communicatively coupled with the at least one processor and storing processor-readable code that, when executed by the at least one processor, is configured to cause the network entity to perform the method of any of aspects 41-59.

In aspect 90, the apparatus of aspect 89 further includes a transceiver coupled to the at least one processor.

Aspect 91 is an apparatus for wireless communication at a network entity, comprising means to perform the method of any of aspects 41-59.

In aspect 92, the apparatus of aspect 91 further includes a transceiver.

Aspect 93 is a non-transitory computer-readable medium storing computer executable code, the code when executed by a processor causes the processor to perform the method of any of aspects 41-59.

Aspect 94 is an apparatus for wireless communication at a network entity, comprising: at least one processor and at least one memory communicatively coupled with the at least one processor and storing processor-readable code that, when executed by the at least one processor, is configured to cause the network entity to perform the method of any of aspects 60-78.

In aspect 95, the apparatus of aspect 94 further includes a transceiver coupled to the at least one processor.

Aspect 96 is an apparatus for wireless communication at a network entity, comprising means to perform the method of any of aspects 60-78.

In aspect 97, the apparatus of aspect 96 further includes a transceiver.

Aspect 98 is a non-transitory computer-readable medium storing computer executable code, the code when executed by a processor causes the processor to perform the method of any of aspects 60-78.

What is claimed is:

1. A method of wireless communication at a user equipment (UE), comprising:
receiving, from a base station, a single downlink control information (DCI) indicating a multiple physical downlink shared channel (PDSCH) grant for multiple non-contiguous PDSCH transmissions in at least a first slot and a second slot, wherein the single DCI indicates multiple time gaps between multiple non-contiguous PDSCH resources based on multiple delta values relative to a single $K_0$ value;
receiving a first PDSCH in a first set of symbols in the first slot;
receiving a second PDSCH in a second set of symbols in the second slot based on the single $K_0$ value and a first delta value; and
receiving a third PDSCH in a third set of symbols in a third slot based on the single $K_0$ value and a second delta value.

2. The method of claim 1, wherein the single DCI indicates the multiple time gaps between the multiple non-contiguous PDSCH resources based on the multiple delta values relative to the single $K_0$ value, wherein the multiple PDSCH grant includes:
a first reference index for a first time domain resource allocation (TDRA) table using a first single $K_0$ value, and reception of the second PDSCH in the second slot is based on the multiple PDSCH grant indicating a starting symbol and a length for the second PDSCH that overlaps with the first PDSCH,
a second reference index for a second TDRA table using a second single $K_0$ value and the multiple delta values relative to the second single $K_0$ value, or
a third reference index for a third TDRA table using a third single $K_0$ value that corresponds to multiple start and length indicator values (SLIVs), and the single DCI further includes a mapping indication that maps the multiple SLIVs to at least the first PDSCH and the second PDSCH.

3. The method of claim 1, wherein the single DCI indicates the multiple time gaps between the multiple non-contiguous PDSCH resources based on the multiple delta values relative to the single Ko value, wherein the multiple PDSCH grant includes a first reference index for a first time domain resource allocation (TDRA) table using a first single $K_0$ value, and reception of the second PDSCH in the second slot is based on the multiple PDSCH grant indicating a starting symbol and a length for the second PDSCH that overlaps with the first PDSCH.

4. The method of claim 1, wherein the single DCI indicates the multiple time gaps between the multiple non-contiguous PDSCH resources based on the multiple delta values relative to the single $K_0$ value, wherein the multiple PDSCH grant includes: a second reference index for a second TDRA table using a second single Ko value and the multiple delta values relative to the second single Ko value.

5. The method of claim 1, wherein the single DCI indicates the multiple time gaps between the multiple non-contiguous PDSCH resources based on the multiple delta values relative to the single $K_0$ value, wherein the multiple PDSCH grant includes: a third reference index for a third TDRA table using a third single Ko value that corresponds to multiple start and length indicator values (SLIVs), and the single DCI further includes a mapping indication that maps the multiple SLIVs to at least the first PDSCH and the second PDSCH.

6. The method of claim 1, further comprising:
switching from a downlink reception to an uplink transmission during a gap in time between the first set of symbols of the first PDSCH and the second set of symbols of the second PDSCH;
transmitting the uplink transmission during the gap in time; and
switching from the uplink transmission to the downlink reception for at least one of the second PDSCH, control monitoring, or feedback.

7. The method of claim 1, wherein the single DCI schedules the multiple PDSCH grant based on at least one of:
a threshold combined time gap length,
a threshold gap size,
a threshold number of gaps,
a first threshold span size for an allocation of the multiple PDSCH grant including one or more time gaps,
a threshold number of SLIVs per row of a TDRA table, or
a second threshold span size that is based on a number of PDSCH allocated in the multiple PDSCH grant.

8. The method of claim 1, wherein the single $K_0$ value is indicated by reference to a time domain resource allocation (TDRA) table, and the multiple delta values are indicated in the single DCI.

9. The method of claim 1, wherein the single $K_0$ value and the multiple delta values are indicated by reference to a time domain resource allocation (TDRA) table.

10. A method of wireless communication at a user equipment (UE), comprising:
receiving, from a base station, a single downlink control information (DCI) indicating a multiple physical uplink shared channel (PUSCH) grant for multiple non-contiguous PUSCH transmissions in at least a first slot and a second slot, wherein the single DCI indicates multiple time gaps between multiple non-contiguous PUSCH resources based on multiple delta values relative to a single $K_2$ value;
transmitting a first PUSCH in a first set of symbols in the first slot;
transmitting a second PUSCH in a second set of symbols in the second slot based on the single $K_2$ value and a first delta value; and
transmitting a third PUSCH in a third set of symbols in a third slot based on the single $K_2$ value and a second delta value.

11. The method of claim 10, wherein the single DCI indicates the multiple time gaps between the multiple non-contiguous PUSCH resources based on the multiple delta values relative to the single $K_2$ value, wherein the multiple PUSCH grant includes:
a first reference index for a first time domain resource allocation (TDRA) table using a first single $K_2$ value, and transmission of the second PUSCH in the second slot is based on the multiple PUSCH grant indicating a starting symbol and a length for the second PUSCH that overlaps with the first PUSCH,
a second reference index for a second TDRA table using a second single $K_2$ value and the multiple delta values relative to the second single $K_2$ value, or
a third reference index for a third TDRA table using a third single $K_2$ value that corresponds to multiple start and length indicator values (SLIVs), and the single DCI further includes a mapping indication that maps the multiple SLIVs to at least the first PUSCH and the second PUSCH.

12. The method of claim 10, further comprising:
switching from an uplink transmission to a downlink reception during a gap in time between the first set of symbols of the first PUSCH and the second set of symbols of the second PUSCH;
receiving a downlink transmission during the gap in time; and
switching from the downlink reception to the uplink transmission for the second PUSCH.

13. The method of claim 10, wherein the single DCI schedules the multiple PUSCH grant based on at least one of:
a threshold combined time gap length,
a threshold gap size,
a threshold number of gaps,
a first threshold span size for an allocation of the multiple PUSCH grant including one or more time gaps,
a threshold number of SLIVs per row of a TDRA table, or
a second threshold span size that is based on a number of PUSCH allocated in the multiple PUSCH grant.

14. The method of claim 10, wherein the single DCI indicates the at least one time gap between the multiple non-contiguous PUSCH resources based on the multiple delta values relative to the single $K_2$ value, wherein the multiple PUSCH grant includes a first reference index for a first time domain resource allocation (TDRA) table using a first single $K_2$ value, and transmission of the second PUSCH in the second slot is based on the multiple PUSCH grant indicating a starting symbol and a length for the second PUSCH that overlaps with the first PUSCH.

15. The method of claim 10, wherein the single DCI indicates the at least one time gap between the multiple non-contiguous PUSCH resources based on the multiple delta values relative to the single $K_2$ value, wherein the multiple PUSCH grant includes a second reference index for a second TDRA table using a second single $K_2$ value and the multiple delta values relative to the second single $K_2$ value.

16. The method of claim 10, wherein the single DCI indicates the at least one time gap between the multiple non-contiguous PUSCH resources based on the multiple delta values relative to the single $K_2$ value, wherein the multiple PUSCH grant includes a third reference index for a third TDRA table using a third single $K_2$ value that corresponds to multiple start and length indicator values (SLIVs), and the single DCI further includes a mapping indication that maps the multiple SLIVs to at least the first PUSCH and the second PUSCH.

17. An apparatus for wireless communication at a user equipment (UE), comprising:
memory; and
at least one processor coupled to the memory and configured to:
receive, from a base station, a single downlink control information (DCI) indicating a multiple physical downlink shared channel (PDSCH) grant for multiple non-contiguous PDSCH transmissions in at least a first slot and a second slot, wherein the single DCI indicates multiple time gaps between multiple non-contiguous PDSCH resources based on multiple delta values relative to a single $K_0$ value;
receive a first PDSCH in a first set of symbols in the first slot;

receive a second PDSCH in a second set of symbols in the second slot based on the single $K_0$ value and a first delta value; and
receive a third PDSCH in a third set of symbols in a third slot based on the single $K_0$ value and a second delta value.

18. The apparatus of claim 17, wherein the single DCI indicates the multiple time gaps between the multiple non-contiguous PDSCH resources based on the multiple delta values relative to the single Ko value, wherein the multiple PDSCH grant includes:
a first reference index for a first time domain resource allocation (TDRA) table using a first single $K_0$ value, and reception of the second PDSCH in the second slot is based on the multiple PDSCH grant indicating a starting symbol and a length for the second PDSCH that overlaps with the first PDSCH,
a second reference index for a second TDRA table using a second single $K_0$ value and the multiple delta values relative to the second single $K_0$ value, or
a third reference index for a third TDRA table using a third single $K_0$ value that corresponds to multiple start and length indicator values (SLIVs), and the single DCI further includes a mapping indication that maps the multiple SLIVs to at least the first PDSCH and the second PDSCH.

19. The apparatus of claim 17, wherein the at least one processor is further configured to:
switch from a downlink reception to an uplink transmission during a gap in time between the first set of symbols of the first PDSCH and the second set of symbols of the second PDSCH;
transmit the uplink transmission during the gap in time; and
switch from the uplink transmission to the downlink reception for at least one of the second PDSCH, control monitoring, or feedback.

20. The apparatus of claim 17, wherein the single DCI schedules the multiple PDSCH grant based on at least one of:
a threshold combined time gap length,
a threshold gap size,
a threshold number of gaps,
a first threshold span size for an allocation of the multiple PDSCH grant including one or more time gaps,
a threshold number of SLIVs per row of a TDRA table, or
a second threshold span size that is based on a number of PDSCH allocated in the multiple PDSCH grant.

21. The apparatus of claim 17, wherein the single DCI indicates the multiple time gaps between the multiple non-contiguous PDSCH resources based on the multiple delta values relative to the single $K_0$ value, wherein the multiple PDSCH grant includes a first reference index for a first time domain resource allocation (TDRA) table using a first single $K_0$ value, and reception of the second PDSCH in the second slot is based on the multiple PDSCH grant indicating a starting symbol and a length for the second PDSCH that overlaps with the first PDSCH.

22. The apparatus of claim 17, wherein the single DCI indicates the multiple time gaps between the multiple non-contiguous PDSCH resources based on the multiple delta values relative to the single Ko value, wherein the multiple PDSCH grant includes a second reference index for a second TDRA table using a second single Ko value and the multiple delta values relative to the second single $K_0$ value.

23. The apparatus of claim 17, wherein the single DCI indicates the multiple time gaps between the multiple non-contiguous PDSCH resources based on the multiple delta values relative to the single Ko value, wherein the multiple PDSCH grant includes a third reference index for a third TDRA table using a third single $K_0$ value that corresponds to multiple start and length indicator values (SLIVs), and the single DCI further includes a mapping indication that maps the multiple SLIVs to at least the first PDSCH and the second PDSCH.

24. The apparatus of claim 17, wherein the single $K_0$ value is indicated by reference to a time domain resource allocation (TDRA) table, and the multiple delta values are indicated in the single DCI.

25. The apparatus of claim 17, wherein the single $K_0$ value and the multiple delta values are indicated by reference to a time domain resource allocation (TDRA) table.

26. An apparatus for wireless communication at a user equipment (UE), comprising:
memory; and
at least one processor coupled to the memory and configured to:
receive, from a base station, a single downlink control information (DCI) indicating a multiple physical uplink shared channel (PUSCH) grant for multiple non-contiguous PUSCH transmissions in at least a first slot and a second slot, wherein the single DCI indicates multiple time gaps between multiple non-contiguous PUSCH resources based on multiple delta values relative to a single $K_2$ value;
transmit a first PUSCH in a first set of symbols in the first slot;
transmit a second PUSCH in a second set of symbols in the second slot based on the single $K_2$ value and a first delta value; and
transmit a third PUSCH in a third set of symbols in a third slot based on the single $K_2$ value and a second delta value.

27. The apparatus of claim 26, wherein the single DCI indicates the multiple time gaps between the multiple non-contiguous PUSCH resources based on the multiple delta values relative to the single $K_2$ value, and wherein the multiple PUSCH grant includes:
a first reference index for a first time domain resource allocation (TDRA) table using the single $K_2$ value, and transmission of the second PUSCH in the second slot is based on the multiple PUSCH grant indicating a starting symbol and a length for the second PUSCH that overlaps with the first PUSCH,
a second reference index for a second TDRA table using a second single $K_2$ value and the multiple delta values relative to the second single $K_2$ value, or
a third reference index for a third TDRA table using a third single $K_2$ value that corresponds to multiple start and length indicator values (SLIVs), and the single DCI further includes a mapping indication that maps the multiple SLIVs to at least the first PUSCH and the second PUSCH.

28. The apparatus of claim 26, wherein the at least one processor is further configured to:
switch from an uplink transmission to a downlink reception during a gap in time between the first set of symbols of the first PUSCH and the second set of symbols of the second PUSCH;
receive a downlink transmission during the gap in time; and
switch from the downlink reception to the uplink transmission for the second PUSCH.

29. The apparatus of claim 26, wherein the single DCI schedules the multiple PUSCH grant based on at least one of:
- a threshold combined time gap length,
- a threshold gap size,
- a threshold number of gaps,
- a first threshold span size for an allocation of the multiple PUSCH grant including one or more time gaps,
- a threshold number of SLIVs per row of a TDRA table, or
- a second threshold span size that is based on a number of PUSCH allocated in the multiple PUSCH grant.

* * * * *